US010380598B2

(12) United States Patent
Gullo et al.

(10) Patent No.: US 10,380,598 B2
(45) Date of Patent: *Aug. 13, 2019

(54) ITEM STATUS TRACKING

(71) Applicant: United States Postal Service, Washington, DC (US)

(72) Inventors: John Gullo, Cheektowaga, NY (US); Jason Hugo, Alexandria, VA (US); Shea R. Felix, Falls Church, VA (US); Mark J. Briganti, Point Roberts, WA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/662,011

(22) Filed: Jul. 27, 2017

(65) Prior Publication Data
US 2017/0323304 A1    Nov. 9, 2017

Related U.S. Application Data

(63) Continuation of application No. 13/826,644, filed on Mar. 14, 2013, now Pat. No. 9,747,600.
(Continued)

(51) Int. Cl.
*G06F 16/00* (2019.01)
*G06Q 30/00* (2012.01)
(Continued)

(52) U.S. Cl.
CPC .......... *G06Q 30/01* (2013.01); *G06F 16/235* (2019.01); *G06F 16/2358* (2019.01); *G06Q 10/0833* (2013.01)

(58) Field of Classification Search
USPC ................................ 707/999.003, 999.107
See application file for complete search history.

(56) References Cited

U.S. PATENT DOCUMENTS 6,005,945 A * 12/1999 Whitehouse ....... G07B 17/0008
380/51
7,298,264 B1 11/2007 Kuzma et al.
(Continued)

FOREIGN PATENT DOCUMENTS

CN    102044032 A    5/2011
JP    H07-044621 A    2/1995
(Continued)

OTHER PUBLICATIONS

International Search Report and Written Opinion dated Nov. 29, 2013 for PCT/US2013/034696 filed Mar. 29, 2013.

*Primary Examiner* — Son T Hoang
(74) *Attorney, Agent, or Firm* — Knobbe, Martens, Olson & Bear LLP

(57) ABSTRACT

A method and system for tracking the status of a label. The system can include a memory with a database. The database can include an indicator of the label status. The system can additionally include a processor that operates in accordance with instructions stored in the memory. The processor can receive a request to generate a label, update the first database with an identifier that indicates the existence of the label, receive a signal indicating that a service requested by the label has been provided, and update the identifier in the first database to indicate that the requested service has been provided.

12 Claims, 18 Drawing Sheets

Related U.S. Application Data

(60) Provisional application No. 61/618,568, filed on Mar. 30, 2012.

(51) Int. Cl.
  *G06F 16/23* (2019.01)
  *G06Q 10/08* (2012.01)

(56) References Cited

U.S. PATENT DOCUMENTS

| | | | |
|---|---|---|---|
| 7,464,872 B2 * | 12/2008 | Doerwald | G06Q 10/087 235/383 |
| 7,963,437 B1 * | 6/2011 | McBride | G06Q 30/06 235/101 |
| 9,082,234 B1 * | 7/2015 | Clem | G07B 17/00024 |
| 9,208,620 B1 * | 12/2015 | Bortnak | G07B 17/0008 |
| 2002/0091569 A1 * | 7/2002 | Kitaura | G06F 17/60 705/14 |
| 2004/0083228 A1 | 4/2004 | Rainey et al. | |
| 2005/0077346 A1 | 4/2005 | Dutta et al. | |
| 2005/0114221 A1 * | 5/2005 | Walters | G06Q 10/08 705/340 |
| 2006/0064333 A1 | 3/2006 | Razza et al. | |
| 2007/0045930 A1 | 3/2007 | Hayduchok et al. | |
| 2007/0095904 A1 | 5/2007 | Barta et al. | |
| 2007/0246523 A1 | 10/2007 | Reblin | |
| 2008/0097866 A1 * | 4/2008 | Ferreira | G06Q 30/06 705/80 |
| 2009/0177739 A1 * | 7/2009 | Uslontsev | G06Q 10/08 709/203 |
| 2009/0319284 A1 | 12/2009 | Mayer et al. | |
| 2010/0088175 A1 | 4/2010 | Lundquist | |
| 2010/0332284 A1 | 12/2010 | Hilbush et al. | |
| 2011/0066549 A1 * | 3/2011 | Whitehouse | G06Q 10/0831 705/39 |

FOREIGN PATENT DOCUMENTS

| | | |
|---|---|---|
| JP | 2001-261131 | 9/2001 |
| JP | 2002-216195 | 8/2002 |
| JP | 2003-145056 | 5/2003 |
| JP | 2005-208865 | 8/2005 |
| JP | 2009-072969 | 4/2009 |
| WO | WO 2004/001531 A | 12/2003 |

* cited by examiner

ITEM STATUS TRACKING

CROSS REFERENCE TO RELATED APPLICATION

This application is a continuation of U.S. patent application Ser. No. 13/826,644, filed Mar. 14, 2013, which claims priority to and the benefit of U.S. Provisional Application 61/618,568, which was filed Mar. 30, 2012. Any and all priority claims identified in the Application Data Sheet, or any correction thereto, are hereby incorporated by reference under 37 CFR § 1.57.

BACKGROUND

Field of the Invention

The present application relates to item management system and methods.

Description of the Related Art

A postage stamp is a small piece of paper that is purchased and displayed on an item of mail as evidence of payment of postage. Postage stamps are purchased from a postal administration or other authorized vendor and are used to pay for the costs involved in moving mail as well as other business necessities such as insurance and registration. This payment is made at the time that the postage stamp is received, and not at the time that the postal services are provided. While this model has been successfully used for several years, it also can result in people paying for postage that they do not use. Specifically, a person may pay for and receive postage, and the postage is either lost, or it is adhered to an item that does not need to be shipped, or any other of a range of circumstances occur that result in the individual, who paid for the postage, not being able to receive the benefit of his purchase. These problems not only arise in the context of postal services, but can arise in the broader context of any service and service provider.

SUMMARY

Some embodiments relate to a system for tracking the status of an item. The system can include, for example, a first database including item information, which item information can include an identifier indicating the item status, and a processor operating in accordance with instructions stored in a memory. In some embodiments, the processor can receive a request to generate an item, update the identifier in the first database to indicate the existence of the item, receive a signal indicating that a service identified by the item has been provided, and update the identifier in the first database to indicate that the identified service has been provided.

In some embodiments, the system can further include a second database that can include a user identifier such as, for example, a username, a password, and/or a user account number. In some embodiments, the system can further include a third database that can include payment information that can be, for example, associated with the user identifier in the second database.

In some embodiments, the processor can further receive the user identifier, and compare the received user identifier to the user identifier stored in the second database. In some embodiments, the processor can further request payment information from the third database after receiving the signal indicating that that the status of the item has changed. In some embodiments, the processor can further receive a second item request, provide a second item in response to the received item request; and update the first database with the first identifier indicating the existence of the second item. In some embodiments, the process can further receive a signal indicating that the status of the second item has changed, and update the first database with the second identifier indicating the changed item status of the second item.

In some embodiments, the item can be a variety of items, including, for example, a package, an envelope, and/or any other item.

Some embodiments relate to a method of tracking and creating an item. The method can include, for example, receiving a request to generate an electronic version of a item, providing the electronic version of the item in response to the received request, updating an identifier indicating the existence of the item, receiving a signal indicating that the item has been received, which receipt of the item corresponds with the performance of requested services on the item, and updating the identifier to indicate that the item has been received.

In some embodiments of the method, the item includes a unique identifier. In some aspects of the method, providing the item includes providing item information.

In some embodiments, the method further includes receiving a corporeal embodiment of the item information, receiving item information from the corporeal embodiment of the item information, receiving a user identifier and querying a second database to identify a user account associated with the user identifier, requesting payment information after receiving the signal indicating that the status of the item has changed, and/or requesting payment. In some embodiments, the identifying the user account includes, for example, verifying the received user identifier.

Some embodiments relate to a method of tracking status of an item to control initiation of a process. The method can include, for example, storing in a non-transitory storage device an indication defining a first status of the item, detecting use of the item in a pre-defined manner, modifying the indication to define a second state of the item reflective of the detected use; and initiating the process in response to the modification of the indication to define the second state of the item.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION OF EMBODIMENTS OF THE DISCLOSURE

Figure 1:
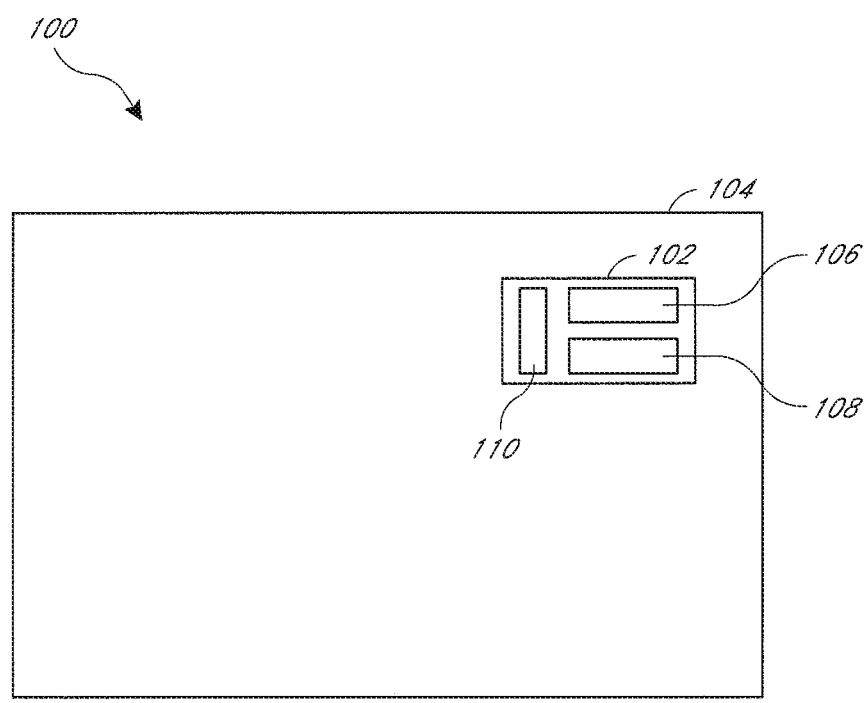
FIG. 1 depicts one embodiment of an item.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The system described herein provides for improved tracking of the status of an item. In some embodiments, the tracking of the status of the item can be used to trigger a payment transaction when, for example, a service is provided relating to the item. In some embodiments, the system described herein provides label information, tracks label status in a database, updates label status information, and requests payment when the label status changes to a specified label status. In some embodiments, the label information can be provided in response to a request for label information, and the label information can be used to create a label that can be used independently or can be associated with an object. In some embodiments, the system provides for improved item tracking of an item received by a service provider, such as, for example, a postal service provider.

One embodiment relates to a system of tracking the status of an item that is provided to a customer in advance of the performance of services, and which is later received by the service provider from the customer at the time that services are provided. In one embodiment, the customer can, for example, provide the service provider with information used to generate the item. In some embodiments, for example, the service provider can use this received information to generate item information, the item information corresponding to a digital version of the item, and the service provider can then send the generated item information to the customer. In some embodiments, the customer can then take the received generated item information and create the item, the creation of the item corresponding to the creation of a tangible version of the item.

In some embodiments, the service provider can, for example, maintain a database containing information relating to the creation of the item, the item, and to the item status. In some embodiments, the service provider may track a variety of different item statuses including, for example, a generated status corresponding to the status arising when the item information is generated, an expired status corresponding to a status arising if too large a time passes between the generation of the item information, and a used status corresponding to an item for which the requested services have been provided. In some embodiments, the different status can result in different system functions such as, for example, the used status can trigger a payment request and/or a payment or other follow-on transaction.

In some embodiments, the customer can deliver the item to the service provider when the customer desires to receive the services. The service provider can receive the item and update the item status in the database to reflect that the services requested by the item are being or have been provided. This update can, in some embodiments, trigger a payment request and/or a payment transaction.

In one specific embodiment in which the service provider is a postal authority and the item is postage, a customer can provide the postal authority with information and request the generation of postage. The postal authority can generate postage information and provide this information to the customer who can then create a physical version of the postage. When the customer would like to have an item associated with the postage delivered, the customer can affix the postage to the item and deliver the item to the postal authority. Upon taking possession of the item bearing the postage, the postal authority can update a database containing information relating to the status of the postage to indicate that requested services have been provided, and can then request payment by the customer.

The Label

FIG. 1 depicts one embodiment of an item 100. The item can comprise any object for which a user desires to receive services. These services can include any services including, for example, storage, cleaning, processing, delivery, or any other service.

In some embodiments, the item 100 can comprise a label 102, or can comprise a label 102 affixed and/or associated with an object 104. Thus, in some embodiments, the label 102 comprises the item 100 receiving the services, and in other embodiments, the label 102 is affixed and/or associated with the object 104 receiving the services.

The label 102 can comprise any feature configured for identification of at least an account. In some embodiments, the label can identify a user account, a class of requested services, information relating to the label 102 and/or object 104, or any other desired information. Thus, in one specific embodiment, a label 102 can be configured for use as postage and can include information identifying a sender's account, the item being mailed with the label 102, and the type of mail service requested. As depicted in FIG. 1, the label 102 can, in some embodiments, be applied to the object 104.

The object 104 can comprise anything capable of receiving services and of physical association with the label 102. In some embodiments, the object 104 can comprise, for example, a package, a box, an envelope, a bag, or any other thing. In some embodiments, the object 104 can be designated for receiving a service from a service provider, such as, delivery, storage, processing, repair, upgrading, or any other service. In one specific embodiment, the object can be designated for delivery to a service provider, and specifically to a mail service provider. In some embodiments, the object 104 can be further designated for delivery by a service provider, such as by the mail service provider.

In some embodiments, the label 102 can provide identification of the requested mail services and indication of payment for the requested mail services. In some embodiments, this information can be located in one or several areas on the label 102. FIG. 1 depicts one embodiment of the label 102 in which this information is located in a first data area 106, a second data area 108, and a third data area 110. A person of skill in the arts will recognize that the present disclosure is not limited to the specific number of data areas 106, 108, 110 depicted in FIG. 1, or the positions of the data areas 106, 108, 110 on the label 102.

The data areas 106, 108, 110 can contain information stored in any desired format. In some embodiments, the data areas 106, 108, 110 can comprise, for example, text, a text string, an image, a computer readable code, a signal emitter, or any other desired format. In some embodiments, the computer readable code can comprise, for example, a barcode such as, for example, a linear barcode, a 2-D barcode, a QR code, an intelligent mail barcode, or any other desired format of barcode or computer readable code. In some embodiments, for example, the signal emitter can comprise, a feature configured to emit energy from a specific portion of the electromagnetic energy spectrum in response to an excitation signal. In some embodiments, this emitting feature can comprise, for example, an RFID tag, a luminescent tag, or any other signal emitting feature.

In some embodiments, each of the data areas 106, 108, 110 can comprise information in one or several formats. In one embodiment, for example, the first data area 106 can comprise, for example, text, the second data area 108 can comprise, for example, an intelligent mail bar code, and the third data area can comprise a RFID tag and a text string.

The Payment Sheet

Figure 1A:
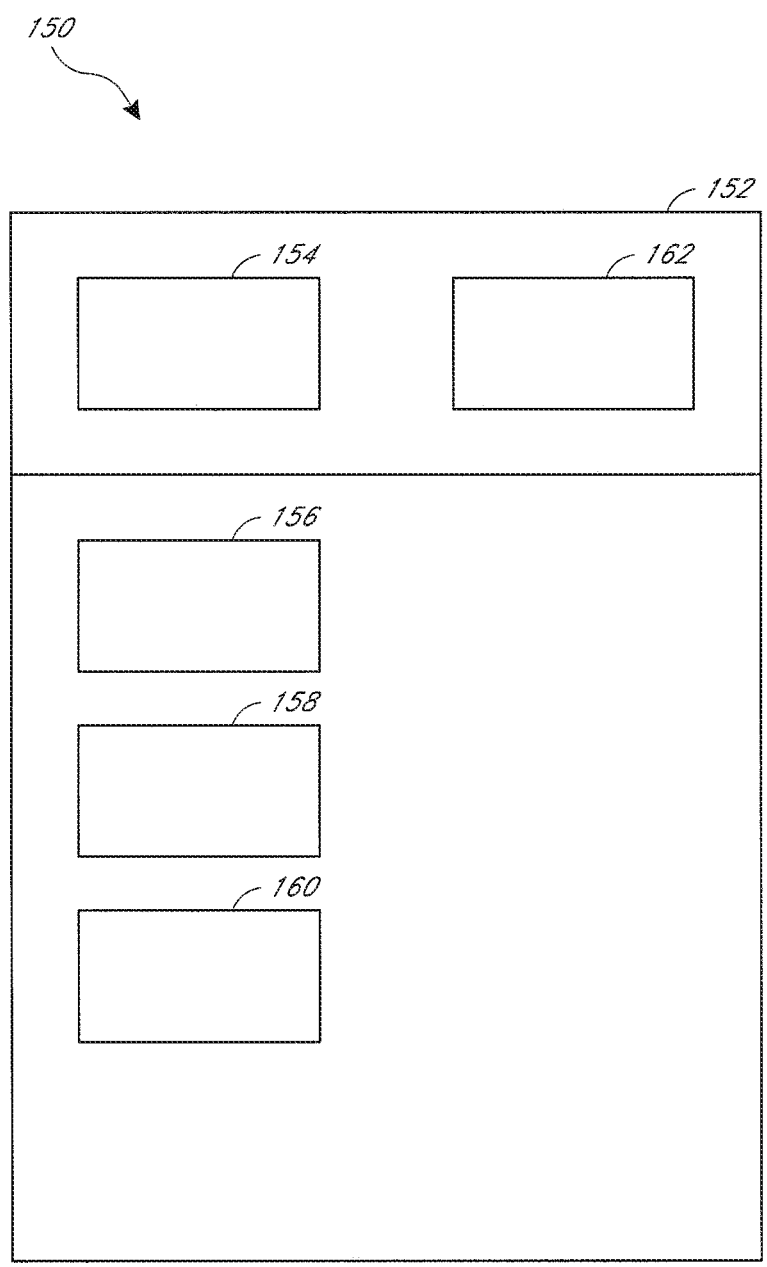
FIG. 1a depicts one embodiment of a payment sheet.

FIG. 1a depicts one embodiment of a payment sheet 150. In some embodiments, the payment sheet 150 can comprise an indicator identifying a group of labels 102, the group comprising at least one label 102. The payment sheet 150 can be used, for example, to facilitate delivery of a number of items 100 to a service provider as each of the items 100 in the group of items 100 is associated with an identifier on the payment sheet 150. Due to the association of each of the items 100 with the payment sheet 150 identifier, by receiving information identifying the received payment sheet 150, a service provider can identify the group of items 100 and more quickly receive the items 100 for service.

The payment sheet can be used to provide label information to a central status tracking system, which central status tracking system will be discussed in detail below, at the time the label 102 is delivered to the service provider (referred to as "induction").

As depicted in FIG. 1a, the payment sheet 150 can comprise a substrate 152. The substrate 152 can comprise any desired material capable of bearing some or all of the below discussed information.

As further depicted in FIG. 1a, one embodiment of the payment sheet 150 comprises a plurality of data fields. These data fields can include information relating to a user account, to one or several labels 102, to service costs, service class, requested services, or any other desired information.

In the embodiment depicted in FIG. 1a, a first data field 154 can comprise, for example, information relating to a user account, a second data field 156 can comprise information relating to a first label 102, a third data field 158 can comprise, for example, information relating to a second label 102, a fourth data field 160 can comprise, for example, information relating to a third label 102, and a fifth data field 162 can comprise, for example, information relating the total number of labels 102 captured on the payment sheet 150. A person of skill in the arts will recognize that the present disclosure is not limited to the specific number of data fields 154, 156, 158, 160, 162, the format of the payment sheet 150, or the above enumerated contents of the data fields 154, 156, 158, 160, 162.

The Status Tracking System

Figure 2:
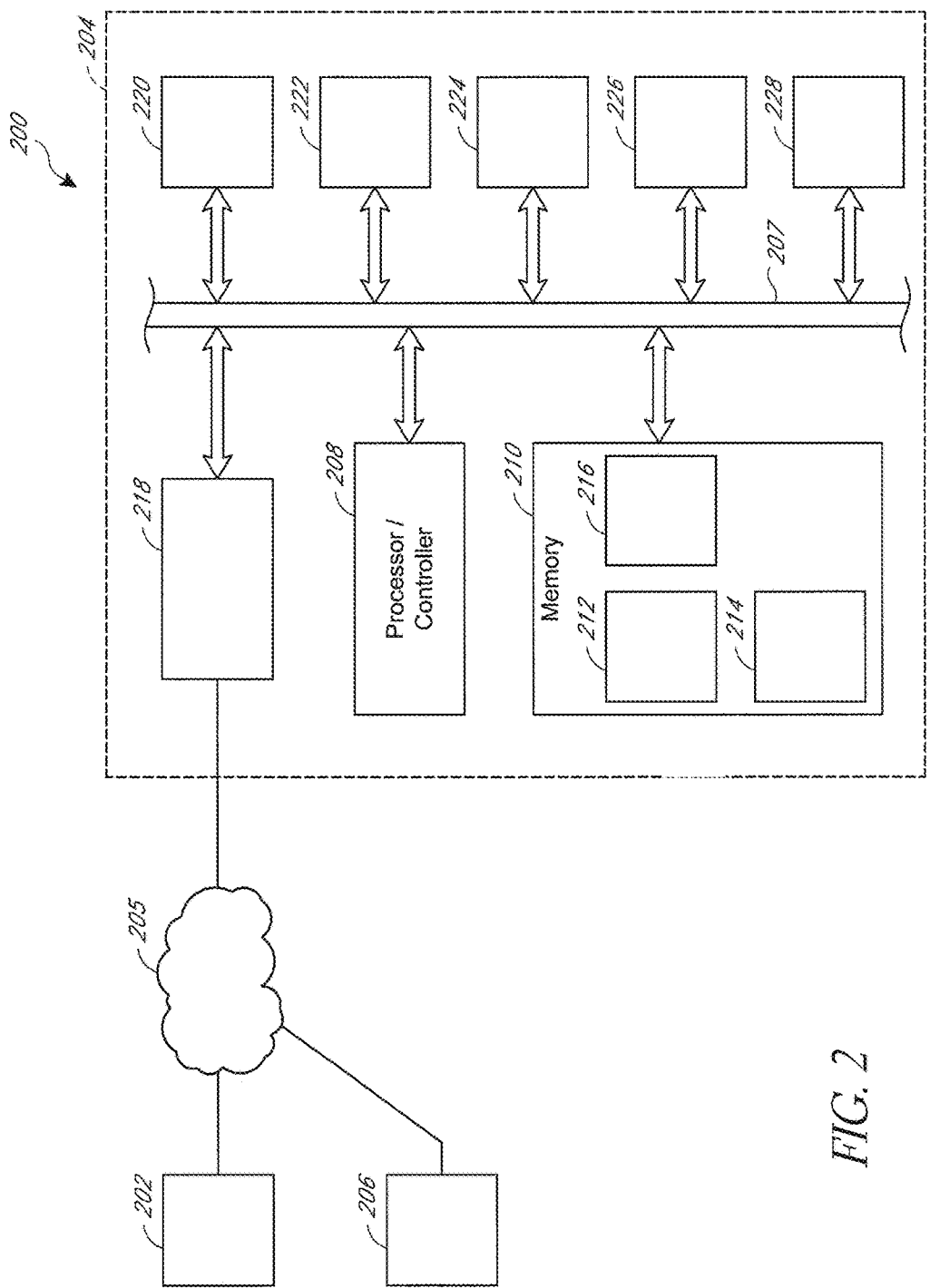
FIG. 2 is a block diagram illustrating one embodiment of a status tracking system.

FIG. 2 is a block diagram illustrating an extended status tracking system 200. The extended status tracking system 200 can be configured, for example, to generate a label, track label status, and transact payment. In some embodiments, the extended status tracking system 200 can further include features configured to read, scan, and/or receive information from a label 102 that has been delivered to a service provider by a user and/or customer. In some embodiments, the extended status tracking system 200 can process the label 102 information that was read, scanned, and/or received by the extended status tracking system 200, and can use this label information to determine a label status such as payment due, service provided, services being provided, or any other desired status. In some embodiments, the label status can be used to trigger an event, such as, for example, a payment request and/or a payment transaction.

In some embodiments, the extended status tracking system 200 can comprise, for example, a user terminal 202. The user terminal 202 can comprise any device capable of allowing a user to communicate with a central status tracking system 204. In some embodiments, the user terminal 202 can comprise, for example, a device comprising a processor such as a personal computer, a laptop computer, smart phone, a cell phone, a tablet, or any other similar device.

As depicted in FIG. 2, the user terminal 202 can be configured to communicate with the central status tracking system 204 via a communication system or network 205. The communication system or network 205 can be configured to communicate signals and can comprise, for example, a local area network (LAN), a wide are network (WAN), the internet, a cell phone network, a telecommunications network, Wi-Fi, or any other communication system.

The extended status tracking system 200 can comprise a payment terminal 206. The payment terminal 206 can comprise any device capable of allowing communication between a payment entity and the central status tracking system 204. In some embodiments, the payment terminal 206 can comprise, for example, a device comprising a processor such as a personal computer, a laptop computer, smart phone, a cell phone, a tablet, or any other device including a processor. As also depicted in FIG. 2, the payment terminal 206 can be configured to communicate with the central status tracking system 204 via the communication system or network 205.

The central status tracking system 204 can comprise a variety of components and modules capable of performing a variety of functions. The central status tracking system 204 can comprise a plurality of components and/or modules which are physically and/or functionally interconnected, and configured to communicate with each other to request, process, and receive information. In some embodiments, the central status tracking system 204 can comprise a stand-alone system capable of performing all of the functions of its specific components and/or modules, and in some embodiments, the central status tracking system 204 can be configured to interact with another or a pre-existing system. In some embodiments in which the central status tracking system 204 interacts with another or a pre-existing system, the modules and/or components of the central status tracking system 204 can request and/or receive information from the other and/or pre-existing system. Thus, in some embodiments, the modules and/or components of the central status tracking system 204 can be configured to perform a task, or to request and/or receive information from another system, component, and/or module relating to a task.

The central status tracking system 204 can be configured to receive inputs from components of the extended status tracking system 200 that are not included in the central status tracking system 204, to provide information to these components, and to perform label generation, label status management, and transact payment. In some embodiments the components and modules of the central status tracking system 204 can be communicatingly connected via a communication feature 207. The communication feature 207 can comprise any feature capable of establishing a communicating connection between the features and modules of the central status tracking system 204 and can include, for example, a wired or wireless device, a BUS, a communications network, or any other suitable feature.

In some embodiments, the central status tracking system 204 can comprise, for example, a processor 208. The processor 208 may comprise a single processor, or may be a component of a processing system implemented with one or more processors. The one or more processors 208 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processor 208 can comprise, for example, a microprocessor, such as a Pentium® processor, a Pentium® Pro processor, a 8051 processor, a MIPS® processor, a Power PC® processor, an Alpha® processor, or the like. The processor 208 typically has conventional address lines, conventional data lines, and one or more conventional control lines.

The processor 208 can be in communicating connection with memory 210. In some embodiments, the memory 210 can be physically located at and/or in the central status tracking system 204, and in some embodiments, the memory can be remote from the central status tracking system 204.

The memory 210 can include, for example, RAM memory, flash memory, ROM memory, EPROM memory, EEPROM memory, registers, hard disk, a removable disk, a CD-ROM, or any other form of storage medium known in the art. The memory can include, for example, software, at least one software module, instructions, steps of an algorithm, or any other information. In some embodiments, the processor 208 can perform processes in accordance with instruction stored in the memory 210. These processes can include, for example, controlling features and/or components of the central status tracking system 204, requesting and/or receiving information from features and/or components of the central status tracking system 204, requesting and/or receiving information from features and/or components of the extended status tracking system 200, transmitting instructions and/or control signals to features and/or components of the central status tracking system 204, requesting information from an administrator, transmitting information to the administrator, processing information received from features and/or components of the central status tracking system 204, processing information received from features and/or components of the extended status tracking system 200, processing information received from the administrator, and/or any other desired processes.

In some embodiments, the memory 210 can comprise one or several databases. The database can comprise an organized collection of digital data. The data stored in the database can comprise any desired data, and can, in some embodiments, relate to functions of the extended status tracking system 200 and/or the central status tracking system 204.

In some embodiments, and as depicted in FIG. 2, the memory 210 comprises a plurality of databases, and specifically provides a label database 212, a user database 214, and a payment database 216. In some embodiments, the label database 212 can comprise, for example, information relating to the label 102. This information can include, for example, data relating to the existence of the label 102, the status of the label 102, the properties of the label 102, the identification of the label 102, the association of the label 102 with a user and/or a user account, or any other desired information.

In some embodiments, the label database 212 can be located at and/or in the central status tracking system 204, and in some embodiments, the label database 212 can be remote from the central status tracking system 204. In some embodiments, the label database 212 can exist within a pre-existing system, and can include information relating to labels that are compatible with the central status tracking system 204, and/or information relating to labels that are noncompatible with the central status tracking system 204. In some embodiments, for example, a label can be compatible with the central status tracking system 204 when the label is generated by an associated user account. In some embodiments, for example, the label database 212 can include information relating to every scan generated by a service provider, such as, for example, every scan of a mail piece collected by a postal service.

In some embodiments the label status information stored in the label database 212 can indicate a label status including, for example, printed, expired, pending induction, payment due, refund, or any other desired status. In some embodiments, the printed status can be associated with a label 102 for which information has been provided to the user terminal 202; the expired status can be associated with a label 102 whose information was not received by the central status tracking system 204 within a designated time period; the pending induction status can be associated with a label 102 that has been added to the payment sheet 150 but whose information has not been received by the central status tracking system 204; the payment due status can be associated with a label 102 whose information has be received by the central status tracking system 204 and for which payment has not been received; and the refund status can be associated with a label 102 for which payment was improperly received, for which unsatisfactory services were provided, or for which paid money should be refunded.

In some embodiments, the user database 214 can comprise information relating to the user and/or the user account. In some embodiments, this information can include, for example, account information such as an account number, a user name, a password, or any other account identification and/or verification information. In some embodiments, the user database 214 can comprise information relating to the account status, including, for example account usage, account payments due, account payments pending, account payments received, requested label 102, expired labels 102, inducted labels 102, frequent recipients, frequent label types or label information, or any other desired information.

In some embodiments, the payment database 216 can comprise payment information. In some embodiments, this information can include, for example, an identifier associating payment information with a user account, account payment information, payment source, payment protocols, and/or any other desired payment information. The account payment information can include any information relating to the payment status of a user account, such as, for example, the amount of payment due, past payments made, and any other historic, current, or projected financial information. The payment source can include, for example, identification of a source for payment, such as, for example, a bank, a credit card, a payment service, or any other source from which payment can be received. In some embodiments, the payment protocols can include instructions or information that facilitates requesting and receiving payment from a payment source. In some embodiments these protocols can include, for example, a verification number, a place or method for submitting a payment request, a time interval for making payment, or any other instructions or information that facilitates requesting and receiving payment.

The central status tracking system 204 can, in some embodiments, comprise a communications module 218 that can be communicatingly connected to the processor 208. In some embodiments, the communications module 218 can be configured to communicate with other extended status tracking system 200 entities, such as, for example, the user terminal 202 and the payment terminal 206. In some embodiments, the communications module 218 can be configured for wired or wireless communications, and can be configured to request information and receive inputs from the user terminal 202, the payment terminal 206, and/or components or modules of the central status tracking system 204.

The central status tracking system 204 can, in some embodiments, comprise a plurality of modules, which modules can be embodied in hardware or software, and which can comprise a single piece or hardware or software or systems of hardware of software. In some embodiments, these modules can be configured to receive or generate inputs for the central status tracking system 204. In one embodiment, and as depicted in FIG. 2, the central status tracking system 204 can comprise a plurality of modules, and can specifically comprise an administrator module 220, a scanning module 222, a tracking module 224, a security module 226, and an aggregation module 228.

In some embodiments, the administrator module 220 can comprise an administrator access point. In some embodiments, the administrator access point can comprise any device, software, or feature capable or requesting and receiving information from the central status tracking system 204 and providing inputs to the central status tracking system 204. In some embodiments, the administrator access point can comprise a terminal and/or an access portal. In some embodiments, the administrator terminal can comprise any device capable or requesting and receiving information from the central status tracking system 204 and providing inputs to the central status tracking system 204. In some embodiments, the administrator terminal can comprise any device capable of allowing an administrator to communicate with a central status tracking system 204. In some embodiments, the administrator terminal can comprise, for example, a device comprising a processor such as, for example, a personal computer, a laptop computer, Smartphone, a cell phone, a tablet, or any other device including a processor. In some embodiments, the access portal can comprise a web portal, or any other software configured to allow an administrator to access information from the central status tracking system 204.

In some embodiments, the administrator access point can be configured to provide an administrator information relating to, for example, the history of the extended status tracking system 200, the history of the central status tracking system 204, statistical and/or financial reports, and payment information. In some embodiments, the statistical reports can include, for example, use statistics for the labels 102, for the extended and/or central status tracking systems 200, 204, for shipping, for one or several user accounts, and/or for any other desired topic. In some embodiments, the financial reports can relate to costs of operating the extended status tracking system 200, costs of operating the central status tracking system 204, revenues from the use of the extended and/or central status tracking systems 200, 204, profits for the extended and/or central status tracking systems 200, 204, and/or any other desired financial report. The payment information can relate to, for example, outstanding bills, paid bills, requested refunds, disputed bills, and or any other payment related information. A person of skill in the art will recognize that the administrator and the administrator module 220 is not limited to the specific functions and features discussed above, but that it can have more or fewer features and functions, and can include different combinations of the above outlined, and/or additional features and functions.

In some embodiments, the scanning module 222 can comprise a device capable of reading, scanning, and/or receiving information from the label 102. In some embodiments, the scanning module 222 can comprise components configured to request and/or receive information from other systems relating to labels scanned in other systems. Thus, in some embodiments in which a label is scanned by a service provider that is not associated with the central status tracking system 204, the scanning module 222 can be configured to request and/or receive information relating to these scanned labels. In some embodiments, this scanned information can be pushed to the central status tracking system 204 by the other system, and/or, this scanned information can be requested by the central status tracking system 204. In some embodiments, this request and/or receipt of information can occur at regular time intervals, in response to a prompt, and/or in response to a user input. Thus, the central status tracking system 204 can, for example, cooperate with a foreign postal authority to receive label information that is scanned in, for example, a foreign country.

In some embodiments, the scanning module 222 can comprise, for example, a scanner, a reader, a detector, an interrogator, or any other feature configured to read, scan, and/or receive information from the label 102. In some embodiments the scanning module 222 can comprise a system including one or several devices capable of reading, scanning, and/or receiving information from a label 102, one or several processors, memory, a communications network, and/or any other desired feature. As depicted in FIG. 2, the scanning module 222 can be in communicating connection with other features of the central status tracking system 204, including, for example, the processor 208.

In some embodiments, the scanning module 222 can be configured to read, scan, and/or receive information from the label 102 at some time after the label 102 has been delivered by the user to the service provider. In some embodiments, and as discussed above, the user can deliver the label 102 to the service provider so that the service provider can provide requested services such as delivering the label 102 and/or the item 100.

In some embodiments, this information can be, for example, converted into digital form by the scanning module and sent to the processor 208 and/or any other desired component of the central status tracking system 204.

The scanning module 222 can be configured to read and/or receive information from the label 102 at different points in a process. In some embodiments, for example, the scanning module 222 can be configured to read, scan, and/or receive information from the label 102 at the time the label 102 is delivered to the service provider. In some embodiments, the scanning module 222 can be configured to read, scan, and/or receive information from the label 102 after the time the label 102 is delivered to the service provider. In some embodiments, the scanning module 222 can be configured to read, scan, and/or receive information from the label 102 while a process is being performed on the label 102 and/or the object 104 associated with the label 102. In some embodiments, the scanning module 222 can be configured to read, scan, and/or receive information from the label 102 before the label 102 and/or the object 104 associated with the label 102 is removed from processing, such as when the label 102 and/or object 104 associated with the label 102 is delivered by a postal authority to a designated recipient. Thus, in some embodiments, the scanning module 222 can be configured to read, scan, and/or receive information from the label 102 at any time that the label 102 is in the possession of the service provider after the label 102 and/or the object 104 associated with the label 102 has been delivered to the service provider, including before, during, or after processing of the label 102 and/or the associated object 104.

In some embodiments, the tracking module 224 can comprise, for example, a system of one or several sensors, a database, and a processor configured to receive data relating to the label 102 and to track processing performed in accordance with the data relating to the label 102. In some embodiments, the data relating to the label 102 can be compiled from the label 102. In some specific embodiments, the data relating to the label 102 can be compiled, for example, into a manifest listing the label 102 and any required processing associated with the label 102. The manifest can be used to facilitate organization and tracking of a plurality of labels 102, and thus, in some embodiments, information relating to a plurality of labels 102 can be compiled into the manifest.

In some embodiments, the security module 226 can comprise, for example, features and components configured to detect and prevent fraud. In some embodiments, the security module 226 can prevent fraudulent payments, fraudulent label requests, erroneous label requests, and or any other desired function.

In some embodiments, the security module 226 can provide security benefits to the user, and in some embodiments, the security module 226 can provide security benefits for the operator of the extended status tracking system 200. In some embodiments, the security module 226 can be configured to prevent fraud associated with a user account, such as, for example, the use of labels associated with an invalid user account, payment fraud, such as, for example, the use of a stolen credit card or payment information to transact a payment, and to prevent label fraud, such as, for example, photocopying and/or reusing a single label.

In one embodiment in which the security module 226 is configured to prevent improper object 104 labeling, the security module 226 can comprise sampling features configured to sample all or a portion of labels 102 to determine if the sampled labels 102 include proper information. This sampling can detect erroneous labeling, such as when the payment amount associated with the label 102 is insufficient to cover the requested services, fraudulent labeling such as when a user systematically improperly labels objects 103, or any other improper labeling practice. In some embodiments, the sampling can detect the payment specified by the label 102, the services requested by the label 102, and label and/or object attributes to determine the proper payment amount. In some embodiments, the security module can compare the calculated payment amount with the payment amount indicated by the label 102 and determine if the label 102 was improper. In some embodiments, the security module 226 can determine that labeling is improper when the payment indicated by the label is more than approximately 10 percent different from the proper payment amount, more that approximately 5 percent different from the proper payment amount, more than approximately 2 percent different from the proper payment amount, more than approximately 1 percent different from the proper payment amount, more than approximately 0.5 percent different from the proper payment amount, or more than any other desired difference between the calculated payment amount and the payment amount indicated by the label 102. A person of skill in the art will recognize that the security module 226 can comprise a variety of features and perform a variety of functions, and that the security module is not limited to the above enumerated features and functions.

In some embodiments, the security module 226 can be configured to provide information to the processor 208, which can, based on instructions found in the memory 210, determine a fraudulent event, and take action to mitigate any loss associated with the fraudulent event. In some embodiments, this loss mitigation can include, for example, notifying a customer of fraudulent activity, notifying a payment institution of fraudulent activity, notifying an item recipient of fraudulent activity, requesting payment from an account holder and/or from a recipient, seizing the item associated with the fraud, and/or any other desired action.

In some embodiments of a central status tracking system 204 in which the central status tracking system 204 cooperates with other systems to request and receive information, the aggregation module 228 can be configured to request and/or receive this information from the other systems. In some specific embodiments, for example, the aggregation module 228 can be configured to query memory and/or a database that is not part of the central status tracking system 204 for information relating to, for example, a scan event, a user account, payment information, security information, and/or any other desired information. In some embodiments, the aggregation module 228 can be configured to sort information from the memory and/or a database that is not part of the central status tracking system 204 to determine whether the information in the memory and/or database not associated with the central status tracking system 204 relates to labels that are compatible with the central status tracking system 204. In some embodiments, this information can be collected from the memory and/or a database that is not associated with the central status tracking system at a regular interval, in response to a prompt and/or user request, or in any other desired fashion.

A person of skill in the art will recognize that the extended status tracking system 200 and/or the central status tracking system 204 can comprise more or fewer features, components, and/or modules than those outlined above, and can be capable of performing more of fewer functions than those outlined above.

Operation of the Status Tracking System

The extended status tracking system 200 and the central status tracking system 204 can be used in connection with the label 102 to track the label 102.

Figure 3:
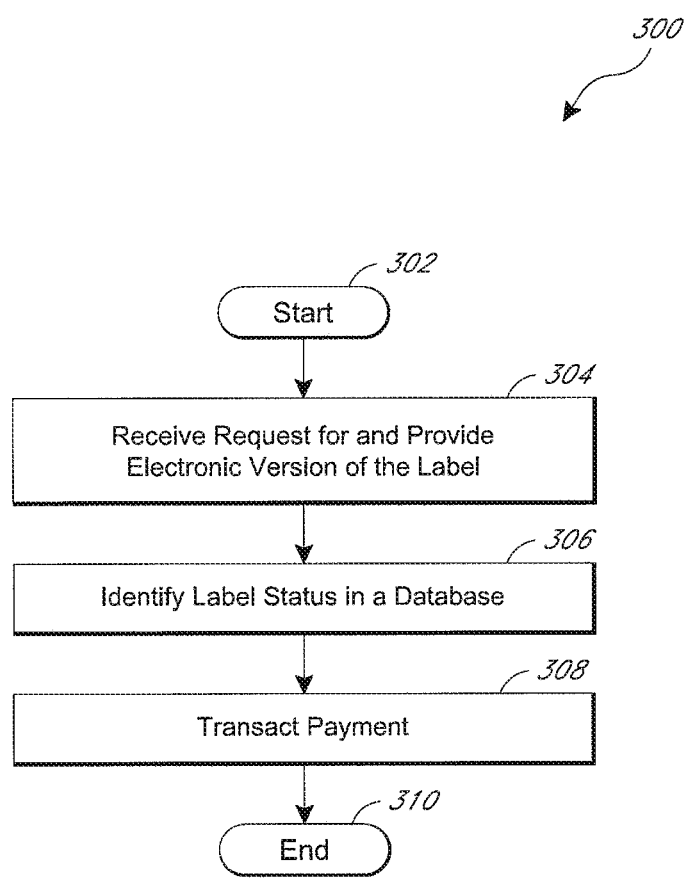
FIG. 3 is a flow-chart illustrating an embodiment of a process for tracking a status of a label to trigger a payment transaction.

FIG. 3 is a flow-chart illustrating one embodiment of a tracking process 300 for tracking the status of a label 102. In some embodiments, the process 300 is performed by the central status tracking system 204. The process begins at block 302 and moves to block 304 where a request is received for an electronic version of the label 102. In some embodiments, the electronic version of the label 102 corresponds to the label 102 in digital format. In response, the electronic version of the label 102 is provided. In some embodiments in which the tracking process 300 is being performed by the central status tracking system 204, the request for the electronic version of the label 102 can be, for example, received by the central status tracking system 204, and specifically received by the communications module 218 of the central status tracking system 204. In some embodiments, the electronic version of the label 102 can be provided by the central status tracking system 204, and specifically by the communications module 218 of the central status tracking system 204 to the user terminal 202.

The process 304 then proceeds to block 306 wherein the central status tracking system 204 identifies the label status in the label database 212. In some embodiments, the label status can be identified in the label database 212 of the central status tracking system 204 by adding an identifier indicating the label status to the label database 212.

The process 300 proceeds to block 308 and transacts payment. In some embodiments, payment can be transacted in response to the inclusion of an identifier in the label database 212 identifying a specified label status. In some embodiments, the payment can be transacted between the central status tracking system 204 and the payment terminal 206.

After payment is transacted in block 308, the process 300 terminates at block 310. A person of skill in the art will recognize that the tracking process 300 for tracking a label 102 can include some or all of the above discussed steps, as well as steps additional to the above requested steps. A person of skill in the art will further recognize that the tracking process 300 for tracking a label 102 can include the above listed steps performed in any order, including in an order different than that shown above.

Figure 3A:
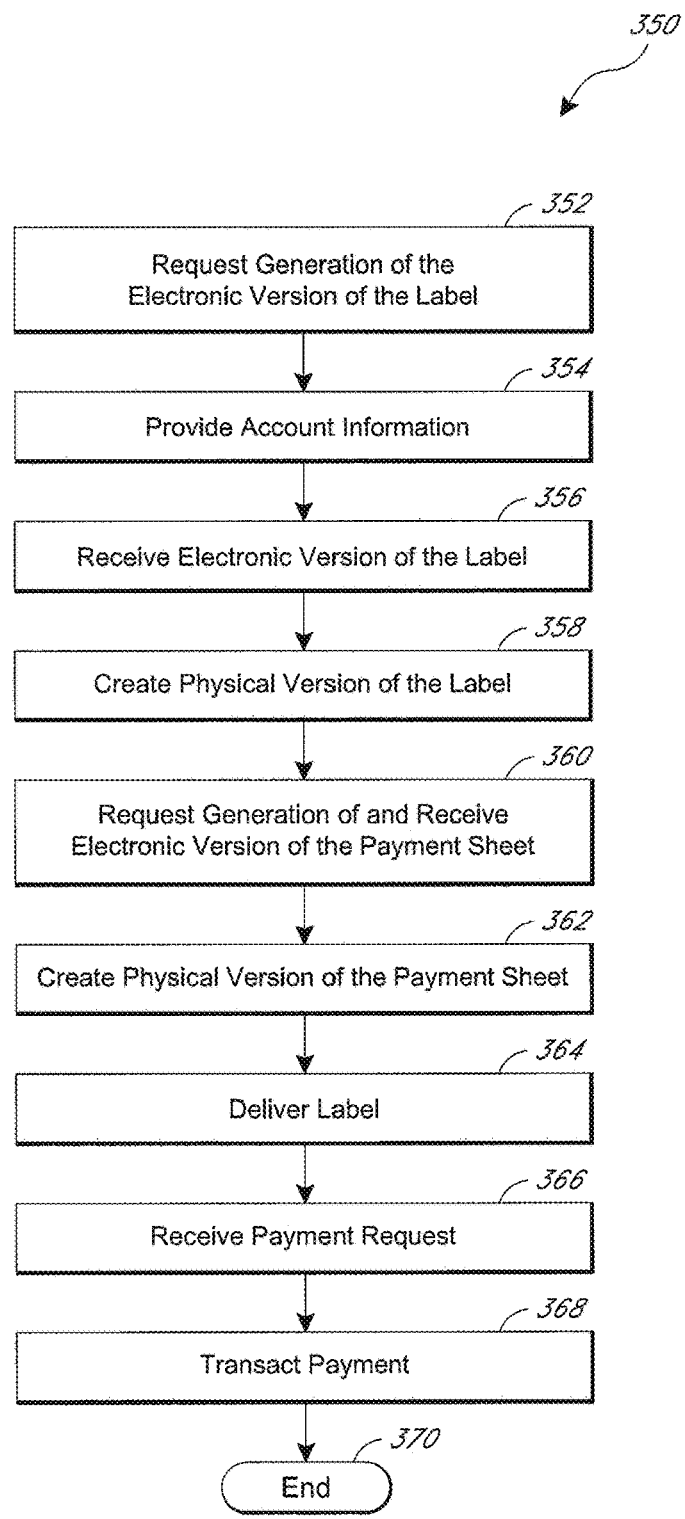
FIG. 3a is a flow-chart illustrating one embodiment of a process for using a central status tracking system.

FIG. 3a is a flow-chart illustrating one embodiment of a process 350 using the user terminal 202 to interact with the central status tracking system 204 to create and use a label. The process 350 begins at block 352 when the user terminal 202 requests an electronic version of the label 102 from the central status tracking system 204. In some embodiments, information for inclusion in the label 102 can be submitted to the central status tracking system 204 with the request for the electronic version of the label 102. In some embodiments, the information submitted with the request for the electronic version of the label 102 can be used to at least partially generate the electronic version of the label 102. In some embodiments, the submitted information can include an origination address and/or a destination address. In some embodiments, information submitted with the request for the electronic version of the label 102 can include an object description, including a description of the nature of the object, of the size of the object, of the weight of the object, or of any other attribute of the object 104. In some embodiments, the information submitted with the request for the electronic version of the label 102 can include, for example, information relating to requested services, such as a class of services, a time period for providing services, insurance, service tracking, confirmation of completion of performance of requested services, or any other service request or designation. In some embodiments, the request for the electronic version of the label 102 can include pricing information for the requested services, customs information to allow providing services across national boundaries, or any other desired information. A person of skill in the art will recognize that a variety of information can be provided with the request for the electronic version of the label 102, and that the present disclosure is not limited to the above specifically enumerated types of information that can be provided with the request for the electronic version of the label 102.

After the request for the electronic version of the label 102, the process 350 moves to block 354 and the user terminal 202 provides account information to the central status tracking system 204. In some embodiments, the account information can be stored in the memory of the user terminal 202, or can be provided to the user terminal 202 by the user. In some embodiments, this account information can include, for example, a user name, a password, an account number, or any other information that identifies the user account.

After the account information is provided to the central status tracking system 204 in block 354, the process 350 moves to block 356 and the user terminal 202 receives the electronic version of the label 102. In some embodiments, the electronic version of the label 102 can be received from the central status tracking system 204, and can include some or all of the information that was submitted with the request for the electronic version of the label 102 and/or information generated by central status tracking system 204.

After the electronic version of the label 102 is received in block 356, the process 350 moves to block 358 and the user terminal 202 creates the physical label 102. In some embodiments, the user terminal 202 can create the physical label 102 by printing the physical label 102, and/or by directing the printing of the physical label.

After the label 102 is created in block 358, the process 350 moves to block 310 and the user terminal 202 requests generation of the electronic version of the payment sheet 150 and then receives the electronic version of the payment sheet 150 from the central status tracking system 204. In some embodiments, the electronic version of the payment sheet 150 can comprise the digitized version of the payment sheet 150.

The payment sheet 150 can include information relating to one or several labels 102, and information, such as information that uniquely identifies the payment sheet 150. In some embodiments, the central status tracking system 204 can query the label database 212 for label information in response to the request for generation of the electronic version of the payment sheet 150. In some embodiments, the user can select which label information will be included in the electronic version of the payment sheet 150. In such an embodiment, the central status tracking system 204 requests the user to select label information for inclusion in the payment sheet 150 and the user selects label information for inclusion in the payment sheet 150.

In some embodiments, information relating to the one or several labels 102 for inclusion in the payment sheet 150 is submitted with the request for the generation of the payment sheet 150, and in some embodiments, the information relating to the one or several labels 102 for inclusion in the payment sheet 150 is generated by the central status tracking system 204.

In some embodiments, after the central status tracking system 204 has generated the electronic version of the payment sheet 150, the electronic version of the payment sheet 150 can be received by the user terminal 202.

After the request for generation of the payment sheet 150 and the receipt of the electronic version of the payment sheet 150 in block 360, the process 350 moves to block 362 and the user terminal 202 creates the physical version payment sheet 150. In some embodiments, the physical version of the payment sheet 150 can be created by, for example, printing the physical version of the payment sheet 150.

After the physical version of the payment sheet 150 is created in block 362, the process 350 moves to block 634 and the label 102 is delivered to the service provider. In some embodiments, the delivery of the label 102 to the service provider can correspond to the delivery of the label 102, or the object 104 bearing the label 102 to the service provider. In some embodiments, the service provider can include a postal authority.

After the label 102 is delivered in block 362, the process 350 moves to block 366 and receives the payment request and/or request for other action, including, for example, a notification of the completion of the providing of the requested services, a prompt for further input, or any other action, from the central status tracking system 204. In some embodiments, the payment request may be received directly at the user terminal 202, and in some embodiments, the payment request may be received at the payment terminal 206.

After the payment request is received in block 366, the process 350 moves to block 368 and the payment is transacted. In some embodiments, the payment can be transacted between the payment terminal 206 and the central status tracking system 204. In some embodiments, transacting payment in the central status tracking system 204 may comprise receiving a down payment, installment payments, or the like. For example, a first percentage of the payment may be required when the label is requested, such as following blocks 352 and 354. In some embodiments, the process 300 may not continue until the first percentage payment is received. In some embodiments, a second percentage of the payment may be requested and made following delivery of the label, such as after block 364. After the payment has been transacted, the process 350 terminates at block 370. A person of skill in the art will recognize that the process 350 for tracking a label 102 can include some or all of the above discussed steps, as well as steps additional to the above requested steps. A person of skill in the art will further recognize that the process 350 for tracking a label 102 can include the above listed steps performed in any order, including in an order different than that shown above.

Figure 3B:
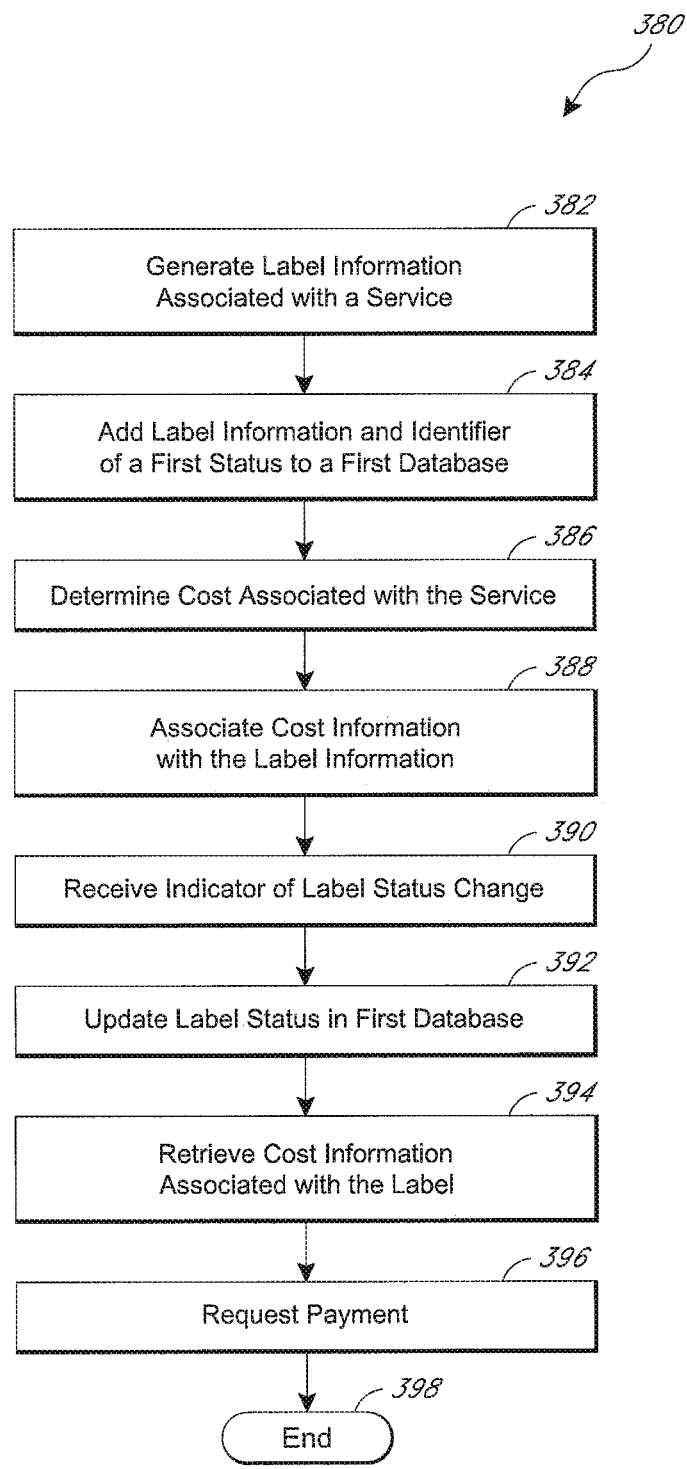
FIG. 3b is a flow-chart illustrating one embodiment of a process using a central status tracking system to provide integral delivery and return service.

FIG. 3b is a flow-chart illustrating one embodiment of a process 380 for using a central status tracking system to provide integral delivery and return service. In some embodiments, for example, the process 380 can be used in connection with a return service, such as, for example, providing a simple method of return for a purchased item. In some embodiments, the process 380 can be used in connection with a service sold with a product, such as, for example, a shipping service integrally associated with a purchased item.

In some embodiments in which the process 380 is used in connection with a return service, a label 102 can be generated and included with a purchased item. In the event that the purchaser wishes to return the item, the label 102 can be used to provide payment for the return service.

In some embodiments in which the process 380 is used in connection with a service sold with a product, the sold product can include the label 102. In the event that the service associated with the sold product is used, the label 102 can be used to provide payment for the associated service. By way of example, a card, such as, for example, a get-well card, may bear a label 102 that can be used to provide payment for a designated delivery service. In some embodiments, the cost of the card can be adjusted to include the cost of the designated delivery service. In such an embodiment, a purchaser would not need to purchase separate postage to mail the card, but could rather use the label 102 to provide payment for the delivery service.

Referring again to FIG. 3b, the process 380 begins at block 382 and the central status tracking system 204 generates label information associated with a service. In some embodiments, the generation of the electronic version of the label 102 can include, for example, formatting information received from the user terminal 202, including information received from the user terminal 202 with the request for the electronic version of the label 102. Generation of the electronic version of the label 102 can also include converting information received from the user terminal 202, including information received from the user terminal 202 with the request for the electronic version of the label 102, into computer readable coding, and/or verifying destination address, price, class requests, and service requests. In some embodiments, the generation of the electronic version of the label 102 can further comprise generating information that uniquely identifies the user account associated with the label 102 and/or uniquely identifies the label 102. In some embodiments, the information that uniquely identifies the user account and/or uniquely identifies the label 102 can be converted to any desired format including, for example, text, text string, computer readable code, or any other format.

In some embodiments, the generation of the electronic version of the label 102 can further comprise, for example, formatting the electronic version of the label 102 so that it is in the desired format.

The process 380 then proceeds to block 384 and the central status tracking system 204 adds the generated label information and an identifier of a first label status to a first database. In some embodiments, the first label status corresponds to the generation of the electronic version of the label 102, and can, for example, be a status indicating the existence of the electronic version of the label 102.

The process 380 then proceeds to block 386 and the central status tracking system 204 determines the cost associated with the requested service. In some embodiments, this cost can be an actual cost, an average cost, and/or an estimated cost. In some embodiments, for example, when all of the variables associated with the requested service are known, the cost can be an actual cost. Thus, for example, in embodiments in which the item weight, size, the shipping distance, and the requested shipping service are known, such as, when an item of known physical properties is being sent from a known induction point to a known delivery point, the cost can be the exact cost. Such an embodiment may, for example, occur with the returning of a purchased item.

In some embodiments in which some or all of the variables associated with the requested service are not known, and in which no data exists as to past provided services, the cost can comprise an estimated cost. Advantageously, the use of labels 102 compatible with the central status tracking system 204 can allow the collection of information relating to the provided services, such as, for example, the physical properties of a shipped item and the shipping services. This information can be collected and used to update the estimated costs to more accurately reflect the actual costs associated with the provided service.

In some embodiments in which some or all of the variables associated with the requested services are not known, and in which data exists relating to past provided services, the cost can comprise an average expected cost based on past provided services. As with the estimated costs, the average cost can be updated based on information collected by the central status tracking system 204 to more accurately reflect the cost of provided services.

After the cost associated with the requested services is determined, the process 380 proceeds to block 388 and the central status tracking system 204 associates the cost information with the label information. In some embodiments, for example, the cost information can be associated with the label information by inputting an indicator of the cost information into the first database.

The process 380 then proceeds to block 390 and the central status tracking system 204 receives an indicator of a status change of the label 102. In some embodiments, this indication of the label status change can originate from one of the modules of the central status tracking system 204, including, for example, the scanning module 222. In some embodiments, the indication of a label status change can comprise an electronic signal communicated from the scanning module 222 to the processor 208 of the central status tracking system 204 indicating that the label 102 has been delivered to the service provider and has been read, scanned, and or received by the scanning module 222. The processor 208 can, in some embodiments, receive this signal and identify the label 102 corresponding to the signal and the label status change corresponding to the signal.

The process 380 then proceeds to block 392 and the central status tracking system 204 updates the label status in the first database to reflect the changed label status. In some embodiments in which the change in label status corresponds to the providing of services or to the receipt of a label 102 for providing service, the update of the label status in the first database can trigger payment processes.

If the change in the label status triggers the start of a payment transaction, then the process 380 proceeds to block 394 and the central status tracking system 204 retrieves the cost information associated with the label 102. The process 380 then proceeds to block 396 and central status tracking system 204 requests payment. The process 380 then terminates at block 398.

Figure 4:
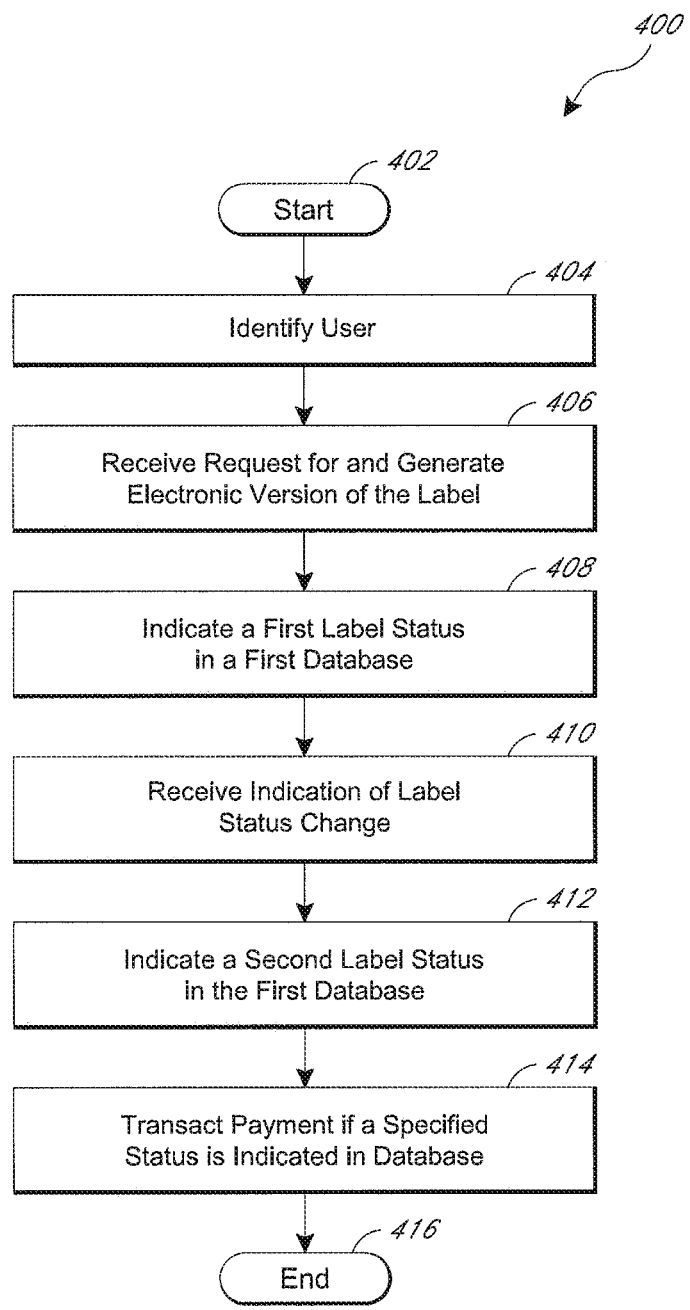
FIG. 4 is a flow chart illustrating another embodiment of a process for tracking a status of a label to trigger a payment transaction.

FIG. 4 is a flow chart illustrating another embodiment of a process 400 for tracking a status of a label. In some embodiments the status of the label 102 can change during the tracking, which status change can trigger the performance of an act by the central status tracking system 204. In one embodiment, the change in the status of the label 102, such as when the label 102 is received by the service provider or when the service provider provides the requested services, can trigger a payment transaction. The process 400 depicted in FIG. 4 is similar to the process depicted in FIG. 3, but includes additional and different steps than depicted in FIG. 3.

The process 400 begins at block 402 and proceeds to block 404 where the central status tracking system 204 identifies the user. The user can be identified based on information submitted by the user terminal 202 to the central status tracking system 204. This submitted information can comprise a variety of information types. In some embodiments, the submitted information can include identification indicia such as, for example, a username, a password, an account number, or any other identifier.

The tracking process 400 then proceeds to block 406 where the central status tracking system 204 receives a request for the electronic version of the label 102 from the user terminal 202 and provides electronic version of the label 102 to the user terminal 202. In some embodiments the request for the electronic version of the label 102 can be received by the communications module 218 of the central status tracking system 204. In some embodiments, the electronic version of the label 102 can be provided to the user terminal by the communications module 218 of the central status tracking system 204.

The tracking process 400 then proceeds to block 408 where the central status processing system 204 identifies a first label status in the label database 212. In some embodiments, the first label status corresponds to the generation of the electronic version of the label 102, and can, for example, a status indicating the existence of the electronic version of the label 102.

The tracking process 400 then proceeds to block 410 where the processor 208 of the central status tracking system 204 receives an indication of a label status change. In some embodiments, this indication of the label status change can originate from one of the modules of the central status tracking system 204, including, for example, the scanning module 222. In some embodiments, the indication of a label status change can comprise an electronic signal communicated from the scanning module 222 to the processor 208 of the central status tracking system 204 indicating that the label 102 has been delivered to the service provider and has been read, scanned, and or received by the scanning module 222. The processor 208 can, in some embodiments, receive this signal and identify the label 102 corresponding to the signal and the label status change corresponding to the signal.

The tracking process 400 then proceeds to block 412 where the second label status, corresponding to the change in the label status, is identified in the first database. In some embodiments, this change in label status can be identified in a first database associated with the central status tracking system 204, and in some embodiments, this change in label status can be identified in a first database that is accessible by the aggregation module 228.

In embodiments in which the change in the label status corresponds to the delivery of the label 102 to the service provider and the providing of requested services, the status change may trigger, for example, the start of a payment transaction. If the change in the label status triggers the start of a payment transaction, then the process 400 proceeds to block 414 where payment is transacted. The tracking process 400 then terminates at block 416. A person of skill in the art will recognize that the tracking process 400 for tracking a label 102 can include some or all of the above discussed steps, as well as steps additional to the above requested steps. A person of skill in the art will further recognize that the tracking process 400 for tracking a label 102 can include the above listed steps performed in any order, including in an order different than that shown above.

Figure 5:
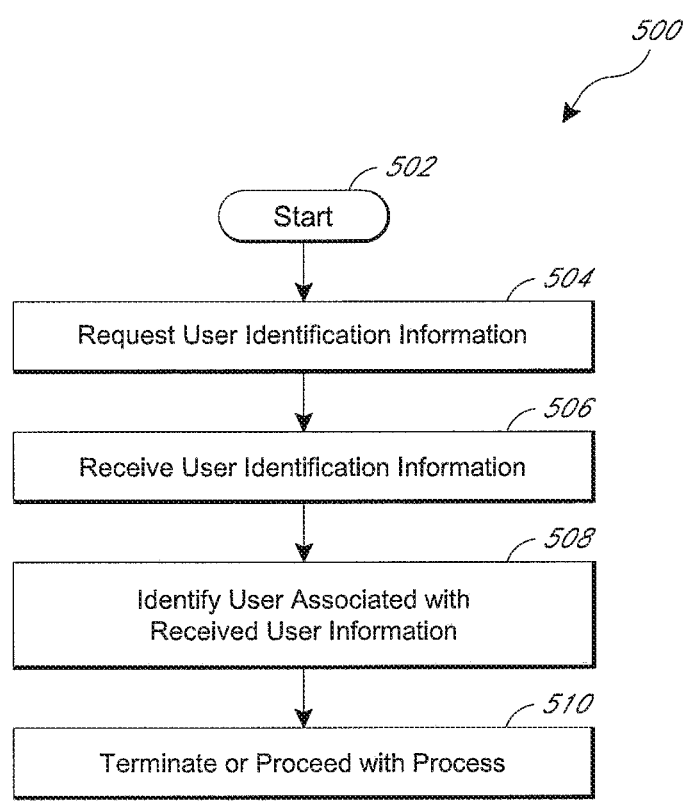
FIG. 5 is a flow-chart illustrating one expanded embodiment of the user identification process performed in block 404 of FIG. 4.

FIG. 5 is a flow-chart illustrating one embodiment of the process for identifying a user defined by block 404 of FIG. 4. The process 500 begins at block 502 and proceeds to block 504 wherein user identification information is requested. In some embodiments, the central status tracking system 204 can request user identification information from the user terminal 202. In some embodiments, the request for user identification information can be in response to a signal received from user terminal 202.

The process 500 then moves to block 506 wherein user identification information is requested from the user terminal 202. As discussed above, the user identification information can comprise any information that identifies a user and/or a user account. As also discussed above, this information can be provided by the user and/or can be stored on the user terminal 202 or other user accessible computing and/or storage device. In some embodiments, this information is received by the central status tracking system 204 from the user terminal 202, and can, in some embodiments, be received by the communications module 218 of the central status tracking system 204 from the user terminal 202.

The process 500 then proceeds to block 508 where the user and/or user account is matched with the received user information. In some embodiments, the processor 208 can receive the user identification information from the user terminal 202 via the communications module 218. In some embodiments, the processor 208 can query the user database 214 to determine if the received user information matches any of the stored information identifying a user and/or a user account. In some embodiments, the processor 208 can query the user database 214 for user and/or user account information. Once the processor 208 has received the user and/or user account information from the user database 214, the processor 208 matches the user and/or user account information from the user database 214 with the information received from the user terminal 202. If the information received from the user terminal 202 matches information received from the user database 214, then the processor 208 identifies a user and/or user account and proceeds to block 406 of FIG. 4. If the information received from the user terminal 202 does not match information retrieved from the user database 214, then the process can terminate at block 510, or can direct the user to open a new user account (not depicted).

A person of skill in the art will recognize that the process 500 for identifying a user can include some or all of the above discussed steps, as well as steps additional to the above requested steps. A person of skill in the art will further recognize that the tracking process 500 for identifying a user can include the above listed steps performed in any order, including in an order different than that shown above.

Figure 6:
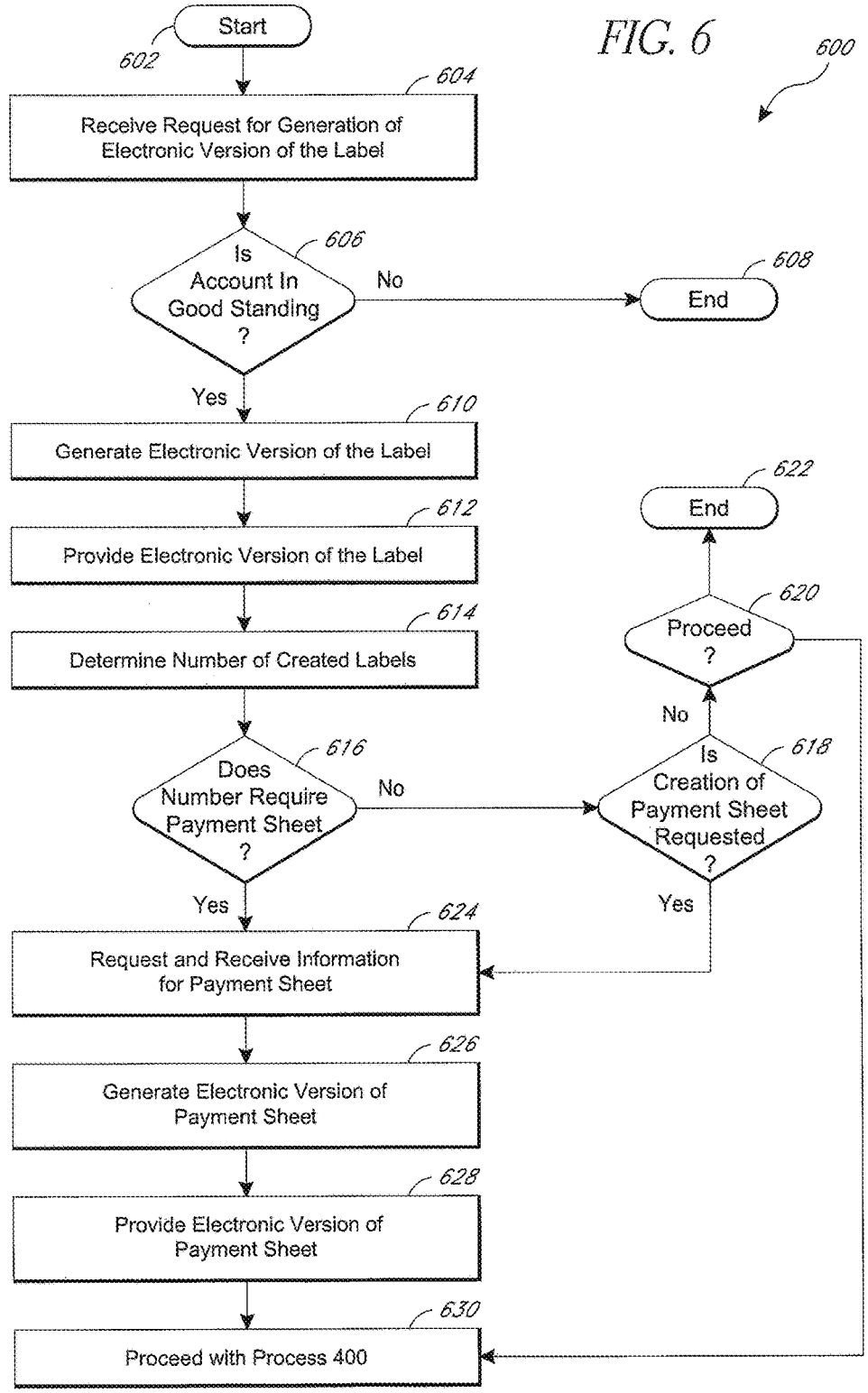
FIG. 6 is a flow-chart illustrating one expanded embodiment of the process associated with receiving the request for and generating the electronic version of the label as performed in block 406 of FIG. 4.

FIG. 6 is a flow-chart illustrating one embodiment of a process for receiving a request for label information at the central status tracking system 204 and for providing label information to the user terminal 202 as defined in block 406 of FIG. 4. The process 600 begins at block 602 and proceeds to block 604 wherein a request is received for the electronic version of the label 102. As discussed, this request can originate at the user terminal 202 and can be communicated to the central status tracking system 204. In some embodiments, this request can be communicated to the central status tracking system 204 via the communication system or network 205. In some embodiments, the request can be received from the user terminal 202 by the central status tracking system 204 at the communications module 218 and communicated to the processor 208. In some embodiments, this request for the electronic version of the label 102 can be made in response to a prompt from the user terminal 202 and/or the central status tracking system 204 for such a request.

In some embodiments, the request for the electronic version of the label 102 can include information for inclusion on the electronic version of the label 102. In some embodiments, for example, a request for the electronic version of the label 102 can include a submission of an origination address and/or a destination address. In some embodiments, for example, the request for the electronic version of the label 102 can include an object description, including description of the nature of the object, of the size of the object, of the weight of the object, or of any other attribute of the object 104. In some embodiments, the request for the electronic version of the label 102 can include, for example, information relating to requested services, such as a class of services, a time period for providing services, insurance, service tracking, confirmation of completion of performance of requested services, or any other service request or designation. In some embodiments, the request for label information can include pricing information for the requested services, customs information to allow providing services across national boundaries, or any other desired information. A person of skill in the art will recognize that a variety of information can be provided with the label request, and that the present disclosure is not limited to the above specifically enumerated types of information that can be provided with the request for label information.

After the request for the electronic version of the label 102 has been received by the central status tracking system 204, the process 600 proceeds to decision state 606 wherein a determination is made as to whether the user account is in good standing. In some embodiments, this determination can include, for example, the central status tracking system 204 querying the user database 214 and/or querying the payment database 216 for information relating to whether the user account is active, whether the user account is current on outstanding payments, whether the balance of payments due is above some threshold, whether the account use is outside of some predetermine range, or any other desired factor. If the user account is not in good standing, the process 600 terminates at block 608.

If the user account is in good standing, as determined by decision state 606, then the process 600 moves to block 610 where the central status tracking system 204 generates the electronic version of the label 102. In some embodiments, the generation of the electronic version of the label 102 can include, for example, formatting information received from the user terminal 202, including information received from the user terminal 202 with the request for the electronic version of the label 102, converting information received from the user terminal 202, including information received from the user terminal 202 with the request for the electronic version of the label 102, into computer readable coding, and/or verifying destination address, price, class requests, and service requests. In some embodiments, the generation of the electronic version of the label 102 can further comprise generating information that uniquely identifies the user account associated with the label 102 and/or uniquely identifies the label 102. In some embodiments, the information that uniquely identifies the user account and/or uniquely identifies the label 102 can be converted to any desired format including, for example, text, text string, computer readable code, or any other format.

In some embodiments, the generation of the electronic version of the label 102 can further comprise, for example, formatting the electronic version of the label 102 so that it is in the desired format.

After the label information is generated in block 610, the process 600 proceeds to block 612 where the central status tracking system 204 provides the electronic version of the label 102 to the user terminal 202. In some embodiments, the electronic version of the label 102 can be provided to the user in a variety of fashions, including, for example, by communicating the electronic version of the label 102 from the central status tracking system 204 to the user terminal 202. In some embodiments, the user can use the electronic version of the label 102 information to create the physical version of the label 102 such as, for example, by printing the physical version of the label 102, and, can attach the physical version of the label 102 to the object 104 such as, for example, by adhering the physical version of the label 102 to the object 104 and/or by printing the physical version of the label 102 on the object 104.

After the electronic version of the label 102 is provided to the user terminal in block 612, the process 600 moves to decision state 614 wherein the central status tracking system 204 determines the number of created labels. In some embodiments, a single label can be created at a time, and in some embodiments, multiple labels can be created at one time.

After the number of created labels is determined, the process 600 proceeds to decision state 616 and the central status tracking system 204 determines if the number of created labels requires a payment sheet 150. In some embodiments, a payment sheet 150 may be required if, for example, more than one label is created at one time. Advantageously, requiring the use of a payment sheet 150 can facilitate the induction of multiple items.

If the central status tracking system 204 determines that the number of labels does not require the creation of a payment sheet 150, then the process proceeds to decision state 618 and the central status tracking system 204 determines if the generation of the electronic version of the payment sheet 150 is requested.

If the creation of the payment sheet 150 has not been requested, the process 600 moves to decision state 620 and the central status tracking system 204 determines whether to proceed. In some embodiments, this determination can be made, for example, by prompting the user whether he wants to proceed, and proceeding based on the user input. If it is determined to not proceed, then the process 600 terminates at block 622. If it is determined to proceed, then the process 600 moves to block 630 and proceeds to block 408 of FIG. 4.

Returning again to decision state 616, if it is determined that the number of created labels requires a payment sheet, then the process 600 proceeds to block 624 and the processor 208 requests and receives information for the generation of the electronic version of the payment sheet 150. Similarly, if it is determined at decision state 618 that the creation of the payment sheet is requested, the process 600 proceeds to block 624 and the processor 208 requests and receives information for the generation of the electronic version of the payment sheet 150.

In some embodiments, the information for the generation of the electronic version of the payment sheet 150 can be requested from the user terminal 202, or from one of the modules or database of the central status tracking system such as the label database 212. In some embodiments, the requested information can comprise, for example, one or several electronic versions of the label 102 generated by the central status tracking system 204.

After the process 600 requests and receives information for generation of the electronic version of the payment sheet 150, the process 600 moves to block 626 where the central status tracking system 204 generates the electronic version of the payment sheet 150.

In some embodiments, the generation of the electronic version of the payment sheet 150 can include, for example, formatting information from the generated electronic versions of the labels 102, converting information from the generated electronic versions of the labels 102 into computer readable coding, and/or verifying destination address, price, class requests, and service requests. In some embodiments, the generation of the electronic version of the payment sheet 150 can further comprise generating information that uniquely identifies the user account associated with the payment sheet 150 and/or uniquely identifies the payment sheet 150. In some embodiments, the information that uniquely identifies the user account and/or uniquely identifies the payment sheet 150 can be converted to any desired format including, for example, text, text string, computer readable code, or any other format.

After the electronic version of the payment sheet 150 is generated in block 620, the process 600 moves to block 628 where the central status tracking system 204 provides the electronic version of the payment sheet 150 to the user terminal 202. In some embodiments, the payment sheet 150 can be provided to the user in a variety of ways, including, for example, by communicating the payment sheet 150 information from the central status tracking system 204 to the user terminal 202. In some embodiments, the user can use the payment sheet 150 information to produce the payment sheet 150 such as, for example, by printing the payment sheet 150.

After the electronic version of the payment sheet 150 is provided by the central status tracking system 204 to the user terminal 202 in block 628, then the process 600 proceeds to block 630 and continues at block 408 of FIG. 4. A person of skill in the art will recognize that the process 600 for receiving a request for label information and for providing label information can include some or all of the above discussed steps, as well as steps additional to the above requested steps. A person of skill in the art will further recognize that the process 600 for receiving a request for label information and for providing label information can include the above listed steps performed in any order, including in an order different than that shown above.

Figure 7:
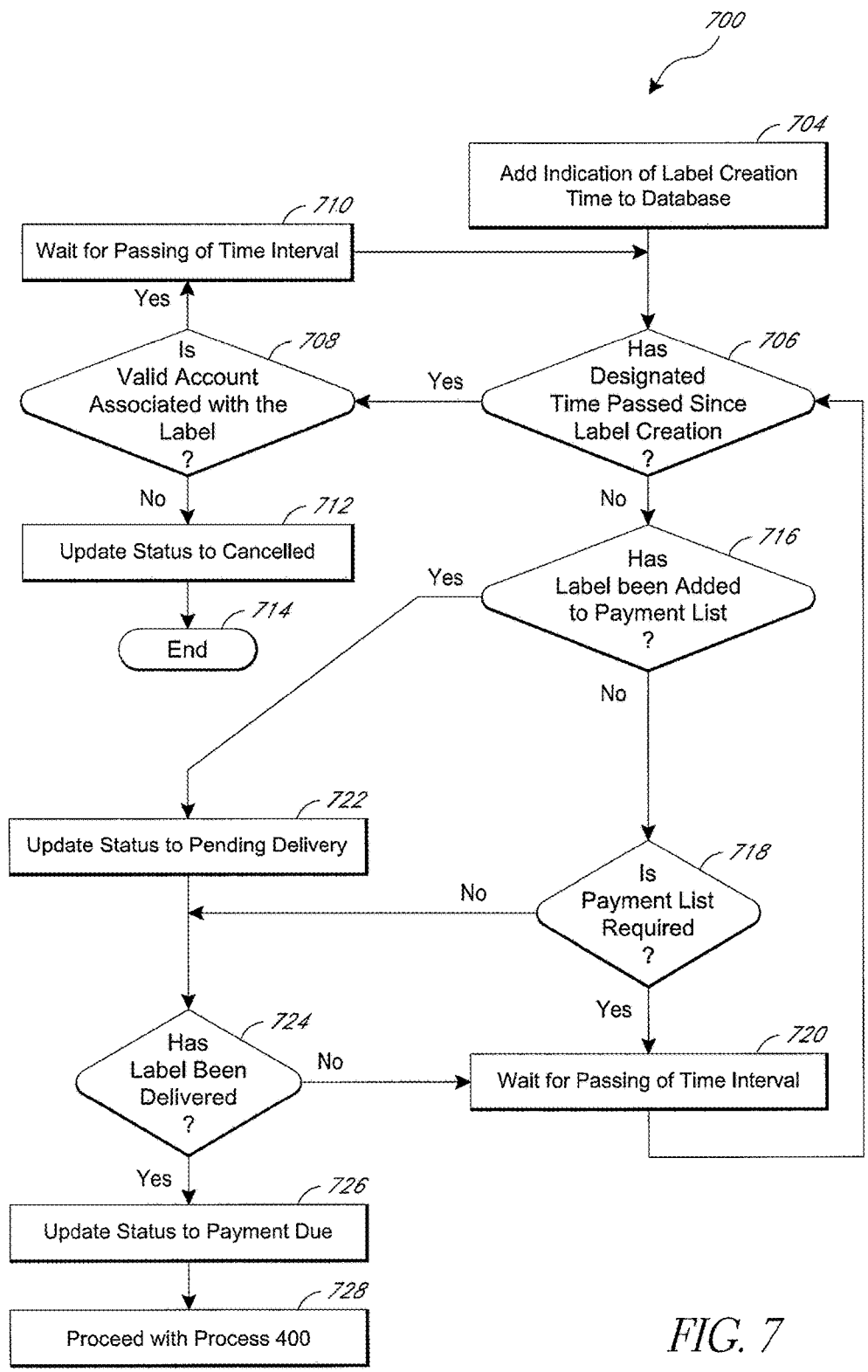
FIG. 7 is a flow-chart illustrating an expanded embodiment of the process for indicating label status in a first database as performed in blocks 408-412 of FIG. 4.

FIG. 7 is a flow-chart illustrating one embodiment of a process for indicating label status in a first database as defined in blocks 408-412 of FIG. 4. In some embodiments, and as depicted in FIG. 7, the process 700 begins at block 704 after the generation of the electronic version of the label 102, and the processor 208 adds an indication of the generation of the electronic version of the label to the label database 212. In some embodiments, the indication of the generation of the electronic version of the label 102 can include an indication of the time and/or date of the generation of the electronic version of the label 102 to the label database 212. In some embodiments, this indication can uniquely identify the created label 102, can identify the user account, and/or provide any other desired information relating to the label 102.

After the indication of the generation of the electronic version of the label 102 has been added to the label database 212 by the processor 208, the process 700 continues to decision state 706 where the processor 208 determines if a designated time has passed since the generation of the electronic version of the label 102. In some embodiments, the process 700 can be configured such that a label status is provided for labels 102 that have not been used within a designated time-frame. In some embodiments, it can be determined in decision state 706 whether the designate time frame has passed, and if the label status should be updated to indicate that the designated time frame has passed. In some embodiments, the passing of the designated time frame can result in a change of the label status to cancelled and/or expired. If it is determined in decision state 706 that the designated time frame has passed, then the process proceeds to decision state 708 and the central status tracking system 204 determines if there is a valid account associated with the label.

In some embodiments, this determination can include querying the user database 214 for information relating to the status of the user account. In some embodiments, this determination can include a query of other portions of the memory 210. In some embodiments, this query can request information relating to recent account activity, to payment information, or to any other indicators of a valid account.

If it is determined that the label 102 is associated with a valid account, then the process 700 proceeds to block 710 and waits for the passing of a designated time interval and then proceeds again to decision state 706. In some embodiments, this designated time interval can comprise any desired time interval from one or several fractions of a second, to one or several months, or to one or several years.

Returning again to decision state 708, if it is determined that a valid account is not associated with the label, then the process 700 proceeds to block 712 and the central status tracking system 204 updates the label status indicate it is to cancelled. In some embodiments, this updated status can be input into the label database 212. After the label status has been updated, the process 700 terminates at block 714. In some embodiments, the process 700 can return to block 414 of FIG. 4 and proceed as previously indicated after block 714.

If the designated time frame has not passed since the generation of the electronic version of the label 102, as determined in decision state 706, the process 700 moves to decision state 716 and the processor 208 determines if the label 102 has been added to the electronic version of the payment sheet 150. In some embodiments, and as discussed above, information relating to one or several labels 102 can be aggregated into a single payment sheet 150.

If the label 102 and/or information relating to the label 102 has not been included in the payment sheet 150 as determined in decision state 716, then the process 700 moves to decision state 718 and the processor 208 determines if the generation of the electronic version of the payment sheet 150 is required. In some embodiments, the label 102 is usable regardless of its inclusion in the payment sheet 150, and in some embodiments, the label 102 is only usable if it is included in the payment sheet 150. If inclusion in the payment sheet 150 is required as determined by the processor at decision state 718, then the process 700 moves to block 720 and waits for the passing of a designated time interval and then proceeds again to decision state 706. In some embodiments, this designated time interval can comprise, for example, one or several second, one or several minutes, one or several hours, one or several days, one or several weeks, one or several months, and/or any other desired time interval.

Returning again to decision state 716, if it is determined that the label 102 has been added to the payment sheet 150, then the process 700 moves to block 722 and the processor 208 updates the label status in label database 212 to pending induction and/or pending delivery.

After the label status has been updated to pending induction in block 722, or if it is determined that the payment sheet 150 is not required in decision state 718, then the process 700 moves to decision state 724 and the processor determines if the label information has been received by the scanning module 222. As discussed above, after the user has printed the label 102, the label 102 can be attached to an object, and can be received by the service provider for the performance of requested services. At some point after the label 102 has been received by the service provider, the label 102 can be read by the scanning module 222. If the label 102 has not been read by the scanning module 222, then the label 102 has not been received and the process moves to block 720 and waits for the passing of a designated time interval and then proceeds again to decision state 706. In some embodiments, this designated time interval can comprise, for example, one or several second, one or several minutes, one or several hours, one or several days, one or several weeks, one or several months, and/or any other desired time interval.

If the label information has been read by the scanning module 222, then the label information has been received and the process moves to block 726 where the label status is updated to payment due. In some embodiments, the label status can be updated in, for example, the label database 212. After the label status has been updated in block 726, the process 700 moves to block 728 and returns to the block 414 of process 400 depicted FIG. 4, and continues as outlined above. A person of skill in the art will recognize that the process 700 for tracking a label status can include some or all of the above discussed steps, as well as steps additional to the above requested steps. A person of skill in the art will further recognize that the process 700 for tracking a label status in a database can include the above listed steps performed in any order, including in an order different than that shown above.

Figure 8:
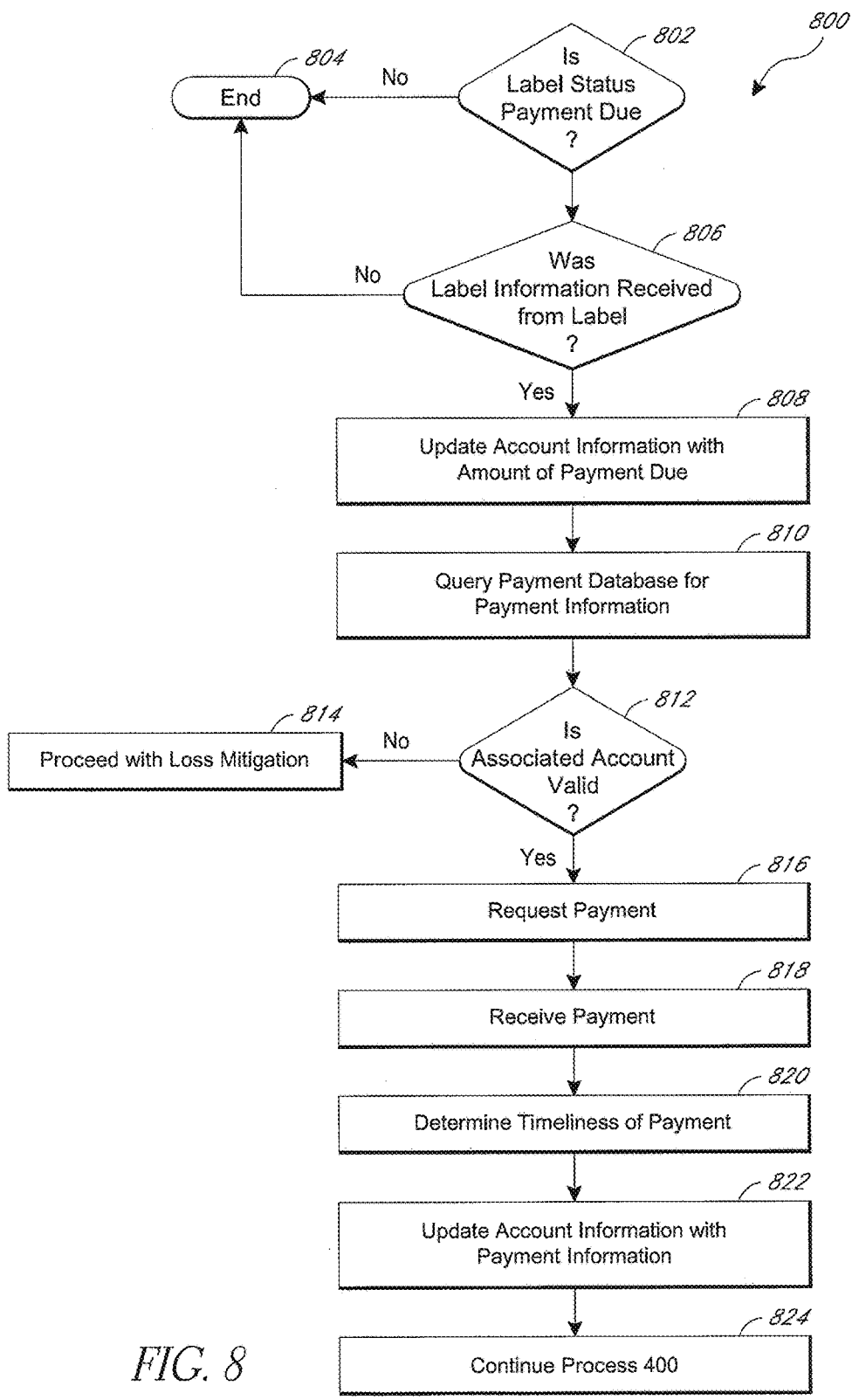
FIG. 8 is a flow-chart illustrating one expanded embodiment of the process for transacting payment performed in block 414 of FIG. 4.

FIG. 8 is a flow-chart illustrating n embodiment of the process for transacting payment as defined in 414 of FIG. 4.

The process 800 begins at decision state 802 where the processor 208 determines if the status of the label 102 indicates that a payment is due. In some embodiments, and as discussed above, the label status is updated to indicate that a payment is due after the label information has been received by the central status tracking system 204. If it is determined in decision state 802 that the status of the label 102 does not indicate that a payment is due, then the process 800 terminates at block 804.

If it is determined in decision state 802 that the status of the label 102 indicates that a payment is due, then the process 800 moves to decision state 806 and the processor 208 determines if the label information that was received by the central status tracking system 204 to cause the status of the label 102 to change to payment due was received from the label 102. In some embodiments, label information can be received form the payment sheet 150 and can cause the status of the label 102 to change to indicate that a payment is due and/or to trigger a payment transaction. In some embodiments, receipt of the label information from the payment sheet 150 can be sufficient to proceed with payment transaction. In some embodiments, receipt of label information from the payment sheet 150 may only be sufficient to proceed with a payment transaction if the label information has also been received directly from the label 102.

In the embodiment depicted in FIG. 8, if it is determined in decision state 806 that the label information was not received from the label 102, then the process 800 terminates at block 804.

If it is determined that the label information was received from the label 102 in decision state 806, then the process 800 moves to block 808 and the processor 208 updates the user account information with the amount of payment due. In some embodiments this information can be added to a database such as, for example, the user database 214 and/or the payment database 216.

After the user account information has been updated the user account information with the amount of payment due in block 808, the process moves to block 810 and the processor 208 queries the payment database 216 for the payment information associated with the user account and/or user associated with the label 102. In some embodiments, the database containing payment information can comprise the payment database 216. In some embodiments, the request for payment information can comprise a request for information relating to the source of payment, such as, for example, the name and/or identification of the financial institution responsible for payment, a routing number, an account number, a verification number, an account holder name, and/or any other information required to receive payment.

After the database containing the payment information has been queried at block 810, the process 800 proceeds to decision state 812 and the central status tracking system 204 determines if the account associated with the label 102 is valid. In some embodiments, this determination can include querying the user database 214 for information relating to the status of the user account. In some embodiments, this determination can include a query of other portions of the memory 210. In some embodiments, this query can request information relating to recent account activity, to payment information, or to any other indicators of a valid account.

If it is determined in decision state 812 that the label 102 is not associated with a valid account, then the process 800 moves to block 814 and proceeds with loss mitigation steps. In some embodiments, this loss mitigation can include, for example, notifying a customer of fraudulent activity, notifying a payment institution of fraudulent activity, notifying an item recipient of fraudulent activity, requesting payment from an account holder and/or from a recipient, seizing the item associated with the fraud, and/or any other desired action.

Returning again to decision state 812, if it is determined that the label 102 is associated with a valid account, then the process 800 moves to block 816 and payment is requested. This request can comprise a communication to the payment terminal 206 from the central status tracking system 204.

After the payment has been requested at block 816, the process moves to block 818 and payment is received.

The process then moves to block 820 and the central status tracking system 204 determines if the payment is timely. In some embodiments, this determination can be made by comparing information relating to when the payment was received with predetermined timeframes. In some embodiments, if payment is received within certain timeframes, then the payment is timely. Similarly, in some embodiments, if payment is not received within certain timeframes, then the payment is untimely.

The process 800 then moves to block 822 and updates the label status and the account information. In some embodiments, the label status can be updated, for example, to the status "paid." This update can be made, in some embodiments, by adding an identifier to a database indicative of the changed label status. In some embodiments, a status associated with the account can be updated. This status can be updated by adding an identifier to a database indicative of the changed account status. In some embodiments in which the user database 214 includes information relating to outstanding payments associated with the user account, the user database 214 can be updated to reflect the new balance of outstanding payments.

After the account information is updated in block 822, the process 800 moves to block 824 and proceeds to block 416 if process 400 as depicted in FIG. 4 and continues as previously outlined. A person of skill in the art will recognize that the tracking process 800 for transacting payment can include some or all of the above discussed steps, as well as steps additional to the above requested steps. A person of skill in the art will further recognize that the process 800 for transacting payment can include the above listed steps performed in any order, including in an order different than that shown above.

Figure 8A:
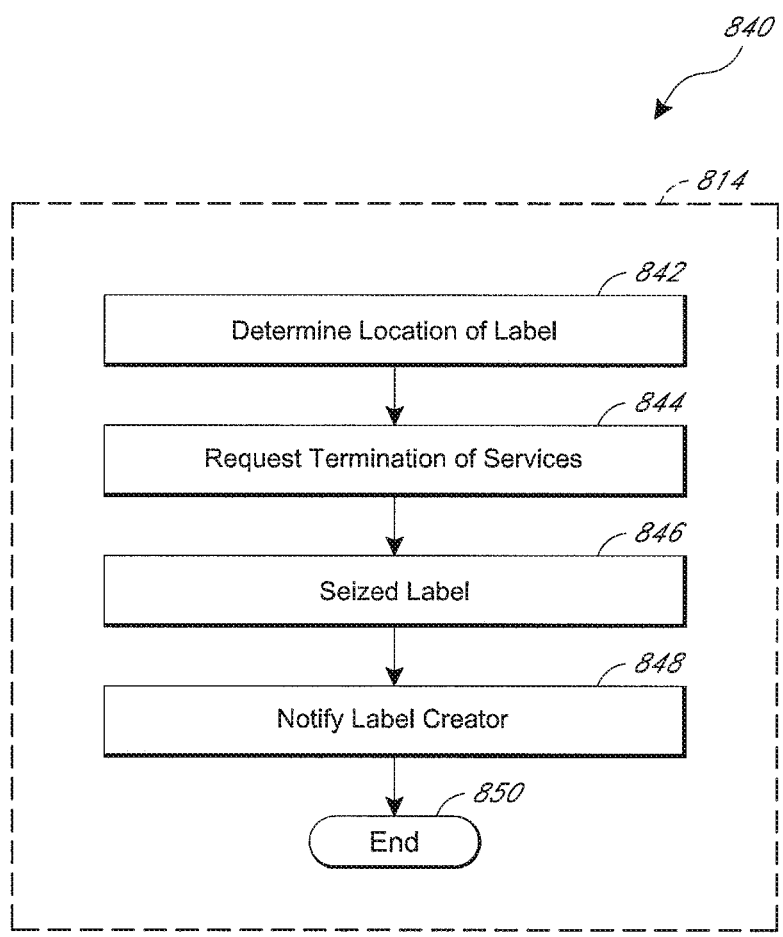
FIG. 8a is a flow-chart illustrating one expanded embodiment of the process for loss mitigation performed in block 814 of FIG. 8.

FIG. 8a is a flow-chart illustrating one expanded embodiment of a process 840 for loss mitigation performed in block 814 of FIG. 8. As discussed above, loss mitigation can include, for example, notifying a customer of fraudulent activity, notifying a payment institution of fraudulent activity, notifying an item recipient of fraudulent activity, requesting payment from an account holder and/or from a recipient, seizing the item associated with the fraud, and/or any other desired action. In some embodiments, loss mitigation can be performed by the central status tracking system 204, and/or other systems.

The process 840 begins at block 842 and the central status tracking system determines the location of the label 102. In some embodiments, this determination of the location of the label 102 can include, for example, identifying the location of the most recent scan event, or by identifying the most recent tracking information. This determination of the location of the label 102 can be made, for example, by querying the scanning module 222 for information relating to the scan event, querying the tracking module 224 for information relating to the most recent tracking information, or by querying the aggregation module 228 for information relating to scan events.

After the location of the label 102 is determined, the process 840 proceeds to block 844 and the central status tracking system 204 requests termination of the providing of any further services. In some embodiments, this request can comprise a communication and/or a signal indicating that services should no longer be provided for the designated label 102. The process 840 then proceeds to block 846 and the label 102 is seized. In some embodiments, the seizing of the label 102 can include removing the label 102 and any associated item 104 from circulation. In some embodiments, the seizing of the label 102 can result in forfeiture procedures.

The process then moves to block 848 and the user is notified. In some embodiments, this notification can comprise, for example, an email, a telephone call, and electronic communication, or any other desired form of notification that indicates that the label has been seized due to association with an invalid account. In some embodiments, a label creator may be able to take steps to retrieve the seized label 102 and any item 104 associated with the label 102. Such step may comprise, for example, the creation of a new account, payment for provided and requested services, payment of a fine, or any other action. The process 800 then terminates at block 850.

The Manifesting Label

Figure 9:
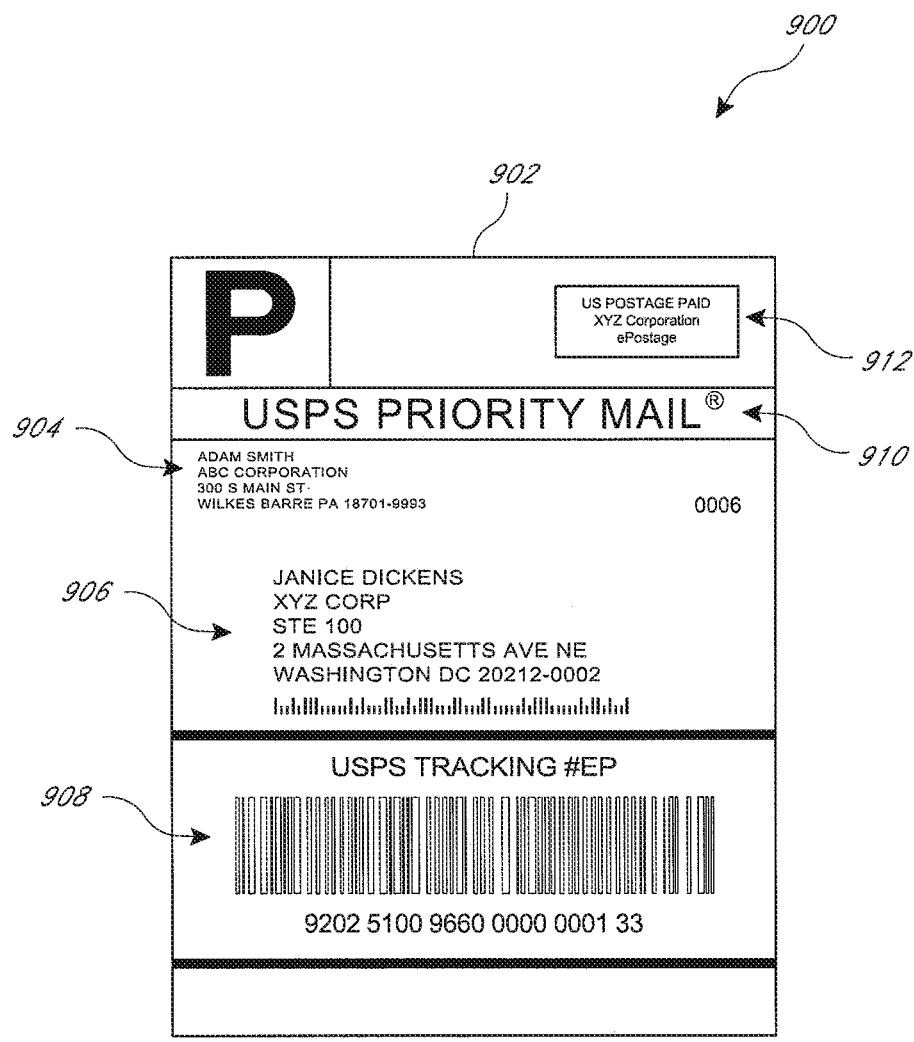
FIG. 9 depicts one embodiment of a label configured for use with a manifesting system.

FIG. 9 depicts one embodiment of a manifesting label 900. The manifesting label 900 can be, for example, the label produced as a result of a request for a manifesting label from a manifesting system. A manifesting label 900 can, in some embodiments, include information received from the user, and/or information provided and/or generated by the manifesting system.

As depicted in FIG. 9, the manifesting label 900 comprises a substrate 902. The substrate 902 can comprise any desired material capable of bearing some or all of the below discussed information.

The manifesting label 900 depicted in FIG. 9 includes information received from a user and information generated and/or provided by the manifesting system. Specifically, the manifesting label 900 depicted in FIG. 9 includes sender information 904 and destination information 906, both of which can be, for example, provided by the user and tracking information 908, service information 910, and payment information 912, all of which can be generated and/or provided by the manifesting system The sender information 904 serves, in some embodiments, to identify the sender, and can, in some embodiments, provide a return destination for an undeliverable manifesting label 900. The sender information 904 can include a variety of desired information, including, for example, an address, identification of the sender, an image, or any other desired information. A person skilled in the art will recognize that the present disclosure is not limited to embodiments with sender information 904, and is also not limited to embodiments including only specific sender information 904.

The destination information 906 can, in some embodiments, identify the specific services desired by the sender. Specifically, as depicted in FIG. 9, the destination information 906 can identify a destination to which the manifesting label 900 should be delivered. The destination information 906 can include a variety of desired information, including, for example, an address, identification of the label recipient, an image, or any other desired information. A person skilled in the art will recognize that the present disclosure is not limited to embodiments with destination information 906, and is also not limited to embodiments including only specific destination information 906.

The tracking information 908 provides, in some embodiments, a unique identification of the manifesting label 900 to allow tracking of the manifesting label 900 as it progresses through a process and or receives requested services. In some specific embodiments, the tracking information 908 on the manifesting label 900 can comprise one or several of: text, a text string, a computer readable code, a barcode, and/or any other feature configured to allow the identification of the label. As depicted in the embodiment of FIG. 9, the tracking information 908 of the manifesting label 900 comprises a text string comprising a plurality of numbers, and a linear barcode.

The service information 910 can, in some embodiments, provide information regarding services requested and associated with the manifesting label 900. In some embodiments this information can include information relating to, for example, a service class, service timeframe, insurance coverage, or any other service related information. The service information 910 contained in the manifesting label 900 of FIG. 9 specifies USPS Priority Mail as the requested service.

The payment information 912 can, in some embodiments, comprise information indicating transacted payment and/or indicating a responsible payer. As depicted in FIG. 9, the payment information 912 indicates that payment has been transacted, the source of the payment, and the manner in which payment was made.

The Manifesting System

Figure 10:
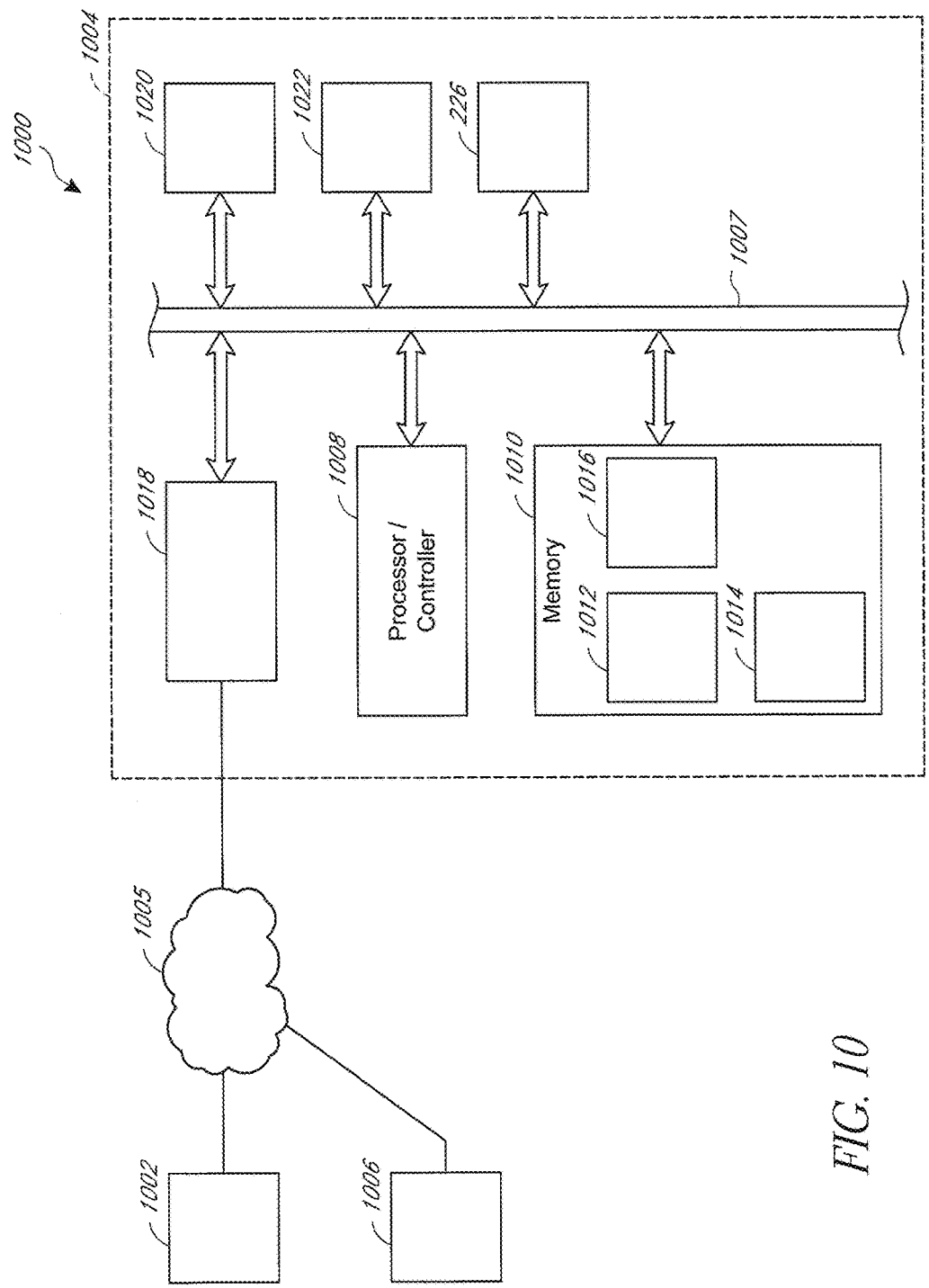
FIG. 10 illustrates one embodiment of a manifesting system.

FIG. 10 is a block-diagram illustrating one embodiment of a manifesting system 1000. The manifesting system 1000 can be configured to receive inputs from a user, generate a label 900, generate a label manifest, and transact payment. In some embodiments, the manifesting system 1000 can perform more or fewer functions than those listed above.

As depicted in FIG. 10, the manifesting system 1000 can comprise, for example, a user terminal 1002. The user terminal 1002 can comprise any device capable of allowing a user to communicate with a central manifesting system 1004. In some embodiments, the user terminal 1002 can comprise, for example, a device comprising a processor such as, for example, a personal computer, a laptop computer, Smartphone, a cell phone, a tablet, or any other similar device.

As depicted in FIG. 10, the user terminal 1002 can be configured to communicate with the central manifesting system 1004 via a communication system or network 1005. The communication system or network 1005 can be configured to communicate signals and can comprise, for example, a local area network (LAN), a wide are network (WAN), the internet, a cell phone network, a telecommunications network, Wi-Fi, or any other communication system.

The manifesting system 1000 can comprise a payment terminal 1006. The payment terminal 1006 can comprise any device capable of allowing communication between a payment entity and the central manifesting system 1004. In some embodiments, the payment terminal 1006 can comprise, for example, a device comprising a processor such as, for example, a personal computer, a laptop computer, Smartphone, a cell phone, a tablet, or any other device including a processor. As also depicted in FIG. 10, the payment terminal 1006 can be configured to communicate with the central manifesting system 1004 via the communication system or network 1005.

The central manifesting system 1004 can comprise a variety of components and modules capable of performing a variety of functions. The central manifesting system 1004 can be configured to receive inputs from components of the manifesting system 1000 that are not included in the central manifesting system 1004, to provide information to these components, and to perform label generation, label manifest generation, and transact payment. In some embodiments the components and modules of the central manifesting system 1004 can be communicatingly connected via a communication feature 1007. The communication feature 1007 can comprise any feature capable of establishing a communicating connection between the features and modules of the central manifesting system 1004 and can include, for example, a wired or wireless device, a BUS, a communications network, or any other suitable feature.

In some embodiments, the central manifesting system 1004 can comprise, for example, a processor 1008. The processor 1008 may comprise a single processor, or may be a component of a processing system implemented with one or more processors. The one or more processors 1008 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processor 1008 can comprise, for example, a microprocessor, such as a Pentium® processor, a Pentium® Pro processor, a 8051 processor, a MIPS® processor, a Power PC® processor, an Alpha® processor, or the like. The processor 208 typically has conventional address lines, conventional data lines, and one or more conventional control lines.

The processor 1008 can be in communicating connection with memory 1010. The memory 1010 can include, for example, RAM memory, flash memory, ROM memory, EPROM memory, EEPROM memory, registers, hard disk, a removable disk, a CD-ROM, or any other form of storage medium known in the art. The memory can include, for example, software, at least one software module, instructions, steps of an algorithm, or any other information. In some embodiments, the processor 1008 can perform processes in accordance with instruction stored in the memory 1010. These processes can include, for example, controlling features and/or components of the central manifesting system 1004, requesting and/or receiving information from features and/or components of the central manifesting system 1004, requesting and/or receiving information from features and/or components of the manifesting system 1000, transmitting instructions and/or control signals to features and/or components of the central manifesting system 1004, requesting information from an administrator, transmitting information to the administrator, processing information received from features and/or components of the central manifesting system 1004, processing information received from features and/or components of the manifesting system 1000, processing information received from the administrator, and/or any other desired processes.

In some embodiments, the memory 1010 can comprise one or several databases. The database can comprise an organized collection of digital data. The data stored in the database can comprise any desired data, and can, in some embodiments, relate to functions of the manifesting system 1000 and/or the central manifesting system 1004.

In some embodiments, and as depicted in FIG. 10, the memory 1010 comprises a plurality of databases, and specifically provides a manifest database 1012, an account database 1014, and a payment database 1016. In some embodiments, the manifest database 1012 can comprise, for example, information relating to one or several manifesting labels 900. In some embodiments, the data stored in the manifest database 1012 can comprise the manifest list. In some embodiments, the manifest list can be the digital manifest database 1012, and in some embodiments, the manifest list can be a printout of the digital manifest database 1012.

In some embodiments, the information relating to one or several manifesting labels 900 can include, for example, data relating to the existence of one or several manifesting labels 900, the properties of the one or several manifesting labels 900, the identification of the one or several manifesting label 900, the association of the manifesting labels 900 with a user and/or a user account, or any other desired information.

In some embodiments, the account database 1014 can comprise information relating to the user and/or the user account. In some embodiments, this information can include, for example, account information such as an account number, a user name, a password, or any other account identification and/or verification information. In some embodiments, the account database 1014 can comprise information relating to the account status, including, for example account usage, account payments due, account payments pending, account payments received, frequent recipients, frequent label types or label information, or any other desired information.

In some embodiments, the payment database 1016 can comprise payment information. In some embodiments, this information can include, for example, an identifier associating payment information with a user account, account payment information, payment source, payment protocols, and/or any other desired payment information. The account payment information can include any information relating to the payment status of a user account, such as, for example, the amount of payment due, past payments made, and any other historic, current, or projected financial information. The payment source can include, for example, identification of a source for payment, such as, for example, a bank, a credit card, a payment service, or any other source from which payment can be received. In some embodiments, the payment protocols can include instructions or information that facilitates requesting and receiving payment from a payment source. In some embodiments these protocols can include, for example, a verification number, a place or method for submitting a payment request, a time interval for making payment, or any other instructions or information that facilitates requesting and receiving payment.

The central manifesting system 1004 can, in some embodiments, comprise a communications module 1018 that can be communicatingly connected to the processor 1008. In some embodiments, the communications module 1018 can be configured to communicate with other manifesting system 1000 entities, such as, for example, the user terminal 1002 and the payment terminal 1006. In some embodiments, the communications module 1018 can be configured for wired or wireless communications, and can be configured to request information and receive inputs from the user terminal 1002, the payment terminal 1006, and/or components or modules of the central manifesting system 1004.

The central manifesting system 1004 can, in some embodiments, comprise a plurality of modules. In some embodiments, these modules can be configured to receive or generate inputs for the central manifesting system 1004. In one embodiment, and as depicted in FIG. 10, the central manifesting system 1004 can comprise a plurality of modules, and can specifically comprise an administrator module 1020, a tracking module 1022, and a security module 226.

In some embodiments, the administrator module 1020 can comprise an administrator access point. In some embodiments, the administrator access point can comprise any device, software, or feature capable or requesting and receiving information from the central manifesting system 1004 and providing inputs to the central manifesting system 1004. In some embodiments, the administrator access point can comprise a terminal and/or an access portal. In some embodiments, the administrator terminal can comprise any device capable or requesting and receiving information from the central manifesting system 1004 and providing inputs to the central manifesting system 1004. In some embodiments, the administrator terminal can comprise any device capable of allowing an administrator to communicate with a central manifesting system 1004. In some embodiments, the administrators terminal can comprise, for example, a device comprising a processor such as, for example, a personal computer, a laptop computer, smart phone, a cell phone, a tablet, or any other device including a processor. In some embodiments, the access portal can comprise a web portal, or any other software configured to allow an administrator to access information from the central manifesting system 1004.

In some embodiments, the administrator access point can be configured to provide an administrator information relating to, for example, the history of the manifesting system 1000, the history of the central manifesting system 1004, statistical and/or financial reports, and payment information. In some embodiments, the statistical reports can include, for example, use statistics for the manifesting labels 900, for the extended and/or manifesting system 1000 and central manifesting system 1004, for shipping, for one or several user accounts, and/or for any other desired topic. In some embodiments, the financial reports can relate to costs of operating the manifesting system 1000, costs of operating the central manifesting system 1004, revenues from the use of the manifesting system 1000 and/or central manifesting system 1004, profits for the manifesting system 1000 and/or central manifesting system 1004, and/or any other desired financial report. In some embodiments, the financial reports or statistical reports relating to a user's us of the manifesting system. The financial reports may include revenues generated based on items sent or distributed using the manifesting system, such as, for example, revenue generated from business reply mail items. The statistical reports may relate to the quantity or number of items associated with a user. The payment information can relate to, for example, outstanding bills, paid bills, requested refunds, disputed bills, and or any other payment related information. A person of skill in the art will recognize that the administrator and the administrator module 1020 is not limited to the specific functions and features discussed above, but that it can have more or fewer features and functions, and can include different combinations of the above outlined, and/or additional features and functions.

In some embodiments, the tracking module 1022 can comprise, for example, a system of one or several sensors, a database, and a processor configured to receive data relating to the manifesting label 900 and to track processing performed in accordance with the data relating to the manifesting label 900. As discussed, the label information from the manifesting label 900 can be, for example, compiled into the manifest database 1012. In some embodiments, information collected by the tracking module 1022 can be compiled in the manifest database 1012. Advantageously the collection of tracking information in addition to label information in the manifest database 1012 allows analysis of services requested by the user, and the services provided to the user.

As discussed at length above, in some embodiments, the security module 226 can comprise, for example, features and components configured to detect and prevent fraud.

In some embodiments, the security module 226 can provide security benefits to the user, and in some embodiments, the security module 226 can provide security benefits for the operator of the manifesting system 1000. Specifically, in one embodiment, the security module 226 can be configured to prevent improper usage of a user account, to detect a fraudulent or improper payment, to detect an improper or fraudulent label, and/or to detect an improperly labeled object 104.

In one embodiment in which the security module 226 is configured to prevent improper object 104 labeling, the security module 226 can comprise sampling features configured to sample all or a portion of manifesting labels 900 to determine if the sampled manifesting labels 900 include proper information. This sampling can detect erroneous labeling, such as when the payment amount associated with the manifesting labels 900 is insufficient to cover the requested services, fraudulent labeling such as when a user systematically improperly labels objects 104, or any other improper labeling practice. In some embodiments, the sampling can detect the payment specified by the manifesting labels 900, the services requested by the manifesting labels 900, and label and/or object attributes to determine the proper payment amount.

In some embodiments, the security module can compare the calculated payment amount with the payment amount indicated by the manifesting labels 900 and determine if the manifesting labels 900 was improper. In some embodiments, the security module 226 can determine that labeling is improper when the payment indicated by the label is more than approximately 10 percent different from the proper payment amount, more that approximately 5 percent different from the proper payment amount, more than approximately 2 percent different from the proper payment amount, more than approximately 1 percent different from the proper payment amount, more than approximately 0.5 percent different from the proper payment amount, or more than any other desired difference between the calculated payment amount and the payment amount indicated by the manifesting labels 900. A person of skill in the art will recognize that the security module 226 can comprise a variety of features and perform a variety of functions, and that the security module is not limited to the above enumerated features and functions.

A person of skill in the art will recognize that the manifesting system and/or the central manifesting system 1004 can comprise more or fewer features, components, and/or modules than those outlined above, and can be capable of performing more of fewer functions than those outlined above.

Operation of the Status Tracking System

Figure 11:
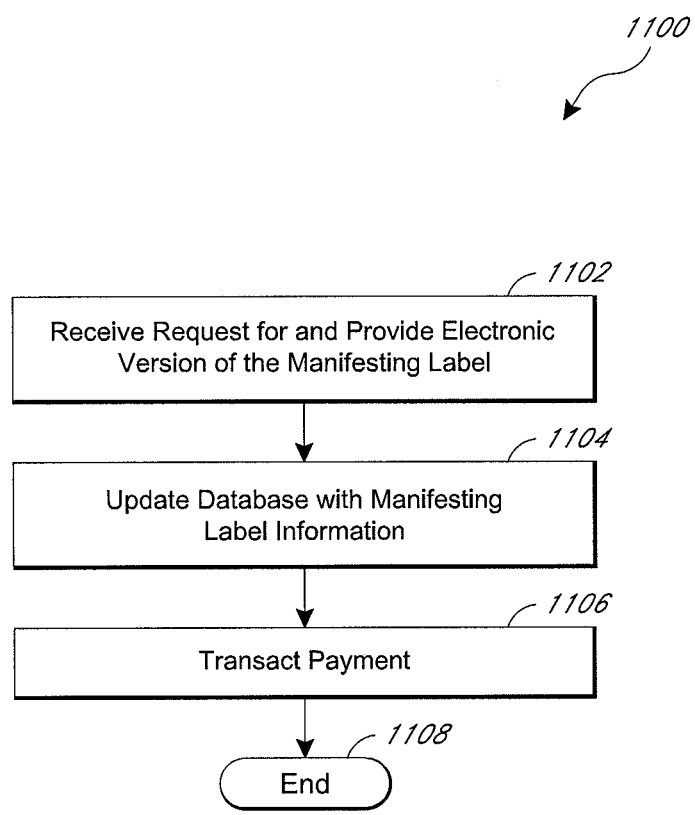
FIG. 11 is a flow-chart illustrating one embodiment of a process for manifesting performed by a central manifesting system.

FIG. 11 is a flow-chart illustrating one embodiment of a process for manifesting performed by a central manifesting system 1004. In some embodiments, the manifesting process can be configured to receive information to produce a manifesting label 900 and store information relating to the manifesting label 900. The process 1100 begins in block 1102 where the central manifesting system 1004 receives a request for the generation of the electronic version of the manifesting label 900 and provides the electronic version of the manifesting label 900 to the user terminal 1002. In some embodiments, the central manifesting system 1004 can be provided by the central manifesting system 1004, and specifically by the communications module 1018 of the central manifesting system 1004 to the user terminal 1002.

The process 1100 then moves to block 1104 where the central manifesting system 1004 updates a database with information relating to the electronic version of the manifesting label 900. In some embodiments, the processor 1008 updates the manifest database 1012 with information relating to the electronic version of the manifesting label 900. In some embodiments, the manifest database 1012 is update with information relating to the electronic version of the manifesting label 900 including, for example, sender information, destination information, requested service information, price information, and/or any other desired information.

The process 1100 proceeds to block 1106 where the central manifesting system 1004 transacts payment. In some embodiments, payment can be transacted in response to providing the electronic version of the manifesting label 900 and/or in response to updating the database with information relating to the electronic version of the manifesting label 900.

After payment is transacted in block 1106, the process 1100 terminates at block 1108. A person of skill in the art will recognize that the process 1100 for operating the manifesting system 1000 can include some or all of the above discussed steps, as well as steps additional to the above requested steps. A person of skill in the art will further recognize that the process 1100 for operating the manifesting system 1000 can include the above listed steps performed in any order, including in an order different than that shown above.

Figure 12:
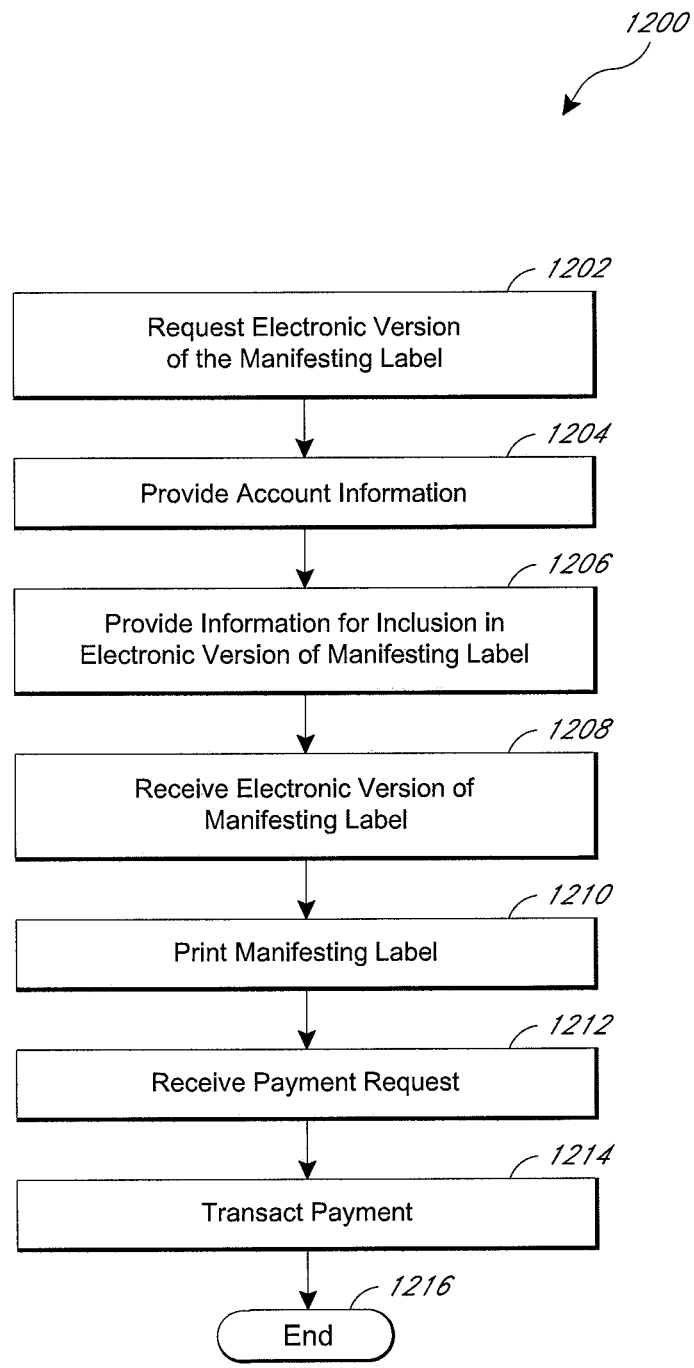
FIG. 12 is a flow-chart illustrating one embodiment of a process for using a central manifesting system.

FIG. 12 is a flow-chart illustrating one embodiment of a process 1200 for using a central manifesting system 1004. In some embodiments, the process 1200 is performed by the user terminal 1002. In some embodiments, and as depicted in FIG. 12, the process 1200 begins at block 1202 and the user terminal 1002 requests the generation of the electronic version of the manifesting label 900. The request for generation of the electronic version of the manifesting label 900 can be communicated from the user terminal 1002 to the central manifesting system 1004.

After the request for the electronic version of the manifesting label 900, the process 1200 moves to block 1204 and the user terminal 1002 provides account information to the central manifesting system 1004. In some embodiments, the account information can be stored in the memory of the user terminal 1002, or it can be provided to the user terminal 1002 by the user. In some embodiments, this account information can include, for example, a user name, a password, an account number, or any other information that identifies the user account.

After the account information is provided to the central manifesting system 1004 in block 1204, the process 1200 moves to block 1206 and the user terminal provides information for inclusion on the manifesting label 900.

In some embodiments, the information for inclusion on the manifesting label 900 can include sender information 904 and/or destination information 906, an object description, including description of the nature of the object, of the size of the object, of the weight of the object, or of any other attribute of an object that will be associated with the manifesting label 900, pricing information for the requested services, customs information to allow providing services across national boundaries, or any other desired information. A person of skill in the art will recognize that a variety of information can be provided, and that the present disclosure is not limited to the above specifically enumerated types of information.

After providing information for inclusion in the manifesting label 900 in block 1206, the process 1200 moves to block 1208 and the user terminal 1002 receives the electronic version of the manifesting label 900. In some embodiments, receiving the electronic version of the manifesting label 900 can comprise receiving unformatted information from the central manifesting system 1004 that is formatted by the user terminal 1002, or receiving a formatted electronic version of the manifesting label 900. In some embodiments, the manifesting label 900 can be received from the central manifesting system 1004, and can include some or all of the provided manifesting label information and/or information generated by central manifesting system 1004.

After the electronic version of the manifesting label 900 is received by the user terminal 1002 in block 1208, the process 1200 moves to block 1210 and the user terminal creates the physical version of the manifesting label and/or prints the physical version of the manifesting label 900. The process 1200 then moves to block 1212 wherein the payment request is received. In some embodiments, the payment request may be received directly at the user terminal 1002, and in some embodiments, the payment request may be received at the payment terminal 1006.

After the payment request is received in block 1212, the process 1200 moves to block 1214 where the payment is transacted, after which the process terminates at block 1216. A person of skill in the art will recognize that the process 1200 for using the manifesting system can include some or all of the above discussed steps, as well as steps additional to the above requested steps. A person of skill in the art will further recognize that the process 1200 for using the manifesting system can include the above listed steps performed in any order, including in an order different than that shown above.

Figure 13:
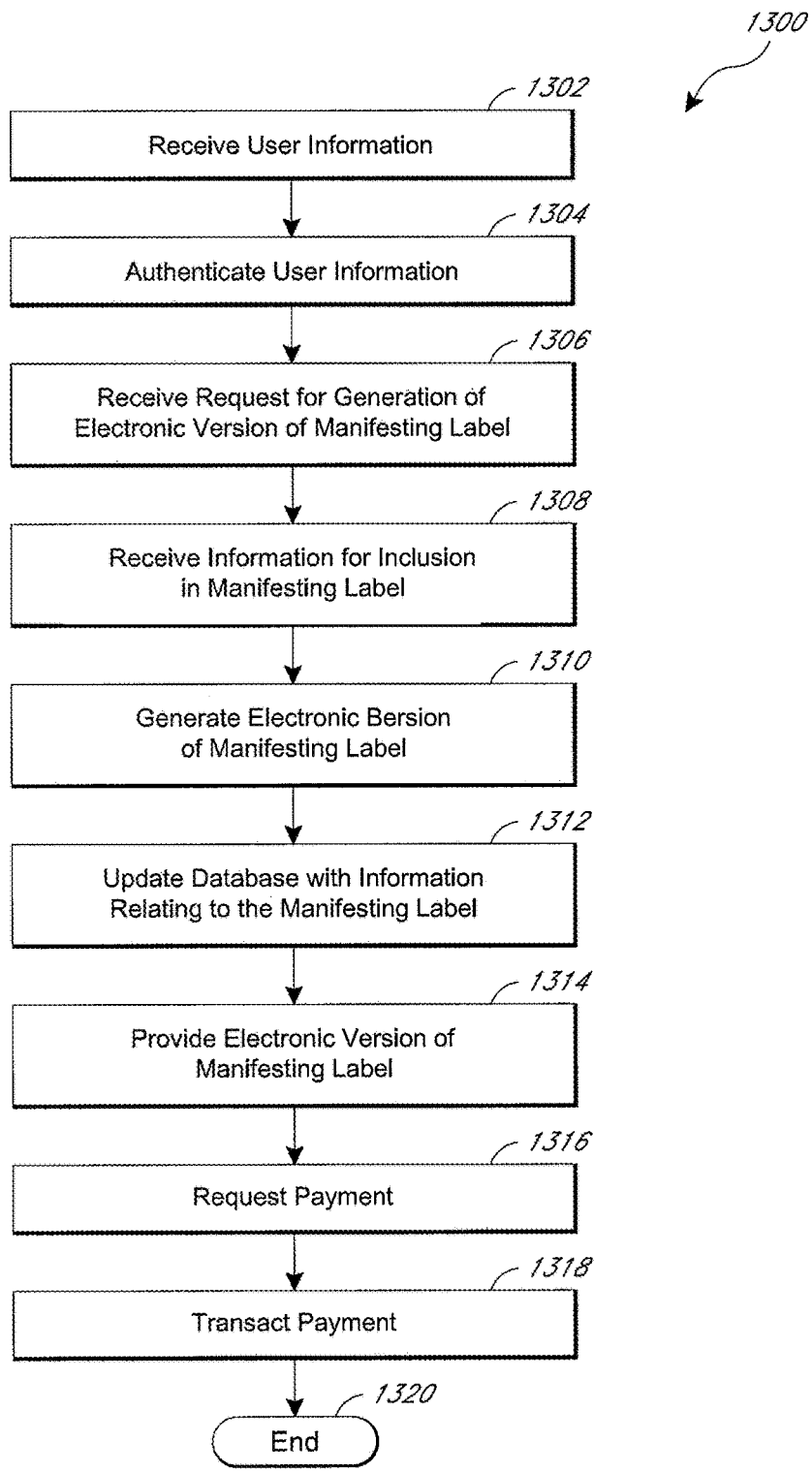
FIG. 13 is a flow-chart illustrating another embodiment of a process for manifesting performed by a central manifesting system.

FIG. 13 is a flow-chart illustrating another embodiment of a process 1300 is a flow-chart illustrating another embodiment of a process for manifesting performed by a central manifesting system. The process 1300 can be configured to identify a user, generate a manifesting label 900, update a database with information from the manifesting label 900, and transact a payment. In some embodiments, the process 1300 can be performed by the central manifesting system 1004.

The process 1300 begins at block 1302 where the central manifesting system 1004 receives user information from the user terminal. As discussed above, the user information can comprise any information that identifies a user and/or a user account. As also discussed above, this information can be provided by the user and/or can be stored on the user terminal 1002 or other user accessible computing and/or storage device. In some embodiments, this information is received by the central manifesting system 1004 from the user terminal 1002, and can, in some embodiments, be received by the communications module 1018 of the central status tracking system 1004 from the user terminal 1002

After the user information is received at the central manifesting system 900, the process 1300 moves to block 1306 wherein the user and/or user account information is matched with the received user information. In some embodiments, the processor 1008 can receive the user identification information from the user terminal 1002 via the communications module 1018. In some embodiments, the processor 1008 can query the user database 1014 to determine if the received user information matches any of the stored information identifying a user and/or a user account. In some embodiments, the processor 1008 can query the user database 1014 for user and/or user account information. Once the processor 1008 has received the user and/or user account information from the user database 1014, the processor 1008 matches the user and/or user account information from the user database 1014 with the information received from the user terminal 1002. If the information received from the user terminal 1002 matches information received from the user database 1014, then the processor 1008 identifies a user and/or user account and proceeds to block 1306. If the information received from the user terminal 1002 does not match information retrieved from the user database 1014 then the process 1300 can terminate, or can direct the user to open a new user account.

After information received from the user terminal 1002 is successfully matched with information retrieved from the user database 1014, the process 1300 proceeds to block 1306 where the central manifesting system 1004 receives a request for the generation of the electronic version of the manifesting label 900 from the user terminal 1002. In some embodiments, the electronic version of the manifesting label 900 can comprise the digital form of the manifesting label 900. In some embodiment, the electronic version of the manifesting label 900 can have the same formatting as the physical version of the manifesting label, different formatting, or be unformatted.

After the request for the generation of the electronic version of the manifesting label 900 is received, the process moves to block 1308 where the central manifesting system 1004 receives information for inclusion on the manifesting label 900 from the user terminal. In some embodiments, this information can be stored in the memory of the user terminal 1002, or can be entered into the user terminal 1002 by the user. In some embodiments, this information can include sender information 904 and/or destination information 906, an object description, including description of the nature of the object, of the size of the object, of the weight of the object, or of any other attribute of an object that will be associated with the manifesting label 900, pricing information for the requested services, customs information to allow providing services across national boundaries, or any other desired information. A person of skill in the art will recognize that a variety of information can be provided, and that the present disclosure is not limited to the above specifically enumerated types of information.

After the information for inclusion in the manifesting label 900 is received, the process 1300 proceeds to block 1310 and the central manifesting system 1004 generates the electronic version of the label. In some embodiments, the central manifesting system 1004 can generate the electronic version of the manifesting label 900 with information received from the user terminal 1002 and with information generated at the central manifesting system 1004. In some embodiments, information generated at the central manifesting system 1004 can include, for example, cost, shipping codes, shipping zones, computer readable codes, manifesting label 900 identification information, or any other information.

After the central manifesting system 1004 generates the electronic version of the manifesting label 900 in block 1310, the process 1300 proceeds to block 1312 and the processor 1008 updates a database with information relating to the electronic version of the manifesting label. In one embodiment, the processor 1008 updates the manifest database 1012. In some embodiments, the processor 1008 updates the manifest database 1012 by adding identifiers indicative of information from the electronic version of the manifesting label 900 to the manifest database 1012.

After the processor 1008 has updated the manifest database 1012 in block 1312, the process 1300 proceeds to block 1314 and the central manifesting system 1004 provides the electronic version of the manifesting label 900 to the user terminal 1002.

After the electronic version of the manifesting label 900 is provided to the user terminal 1002, the process 1300 proceeds to block 1316 and the central manifesting system 1004 requests payment. After payment is requested, the process 1300 proceeds to block 1318 and the central manifesting system 1004 transacts payment. In some embodiments, the transacting of payment can include communication between the central manifesting system 1004 and the user terminal 1002 and/or the payment terminal 1006. After the process 1300 has transacted payment, the process 1300 terminates at block 1320. A person of skill in the art will recognize that the process 1300 for manifesting performed by a central manifesting system can include some or all of the above discussed steps, as well as steps additional to the above requested steps. A person of skill in the art will further recognize that the process 1300 for manifesting performed by a central manifesting system can include the above listed steps performed in any order, including in an order different than that shown above.

Figure 14:
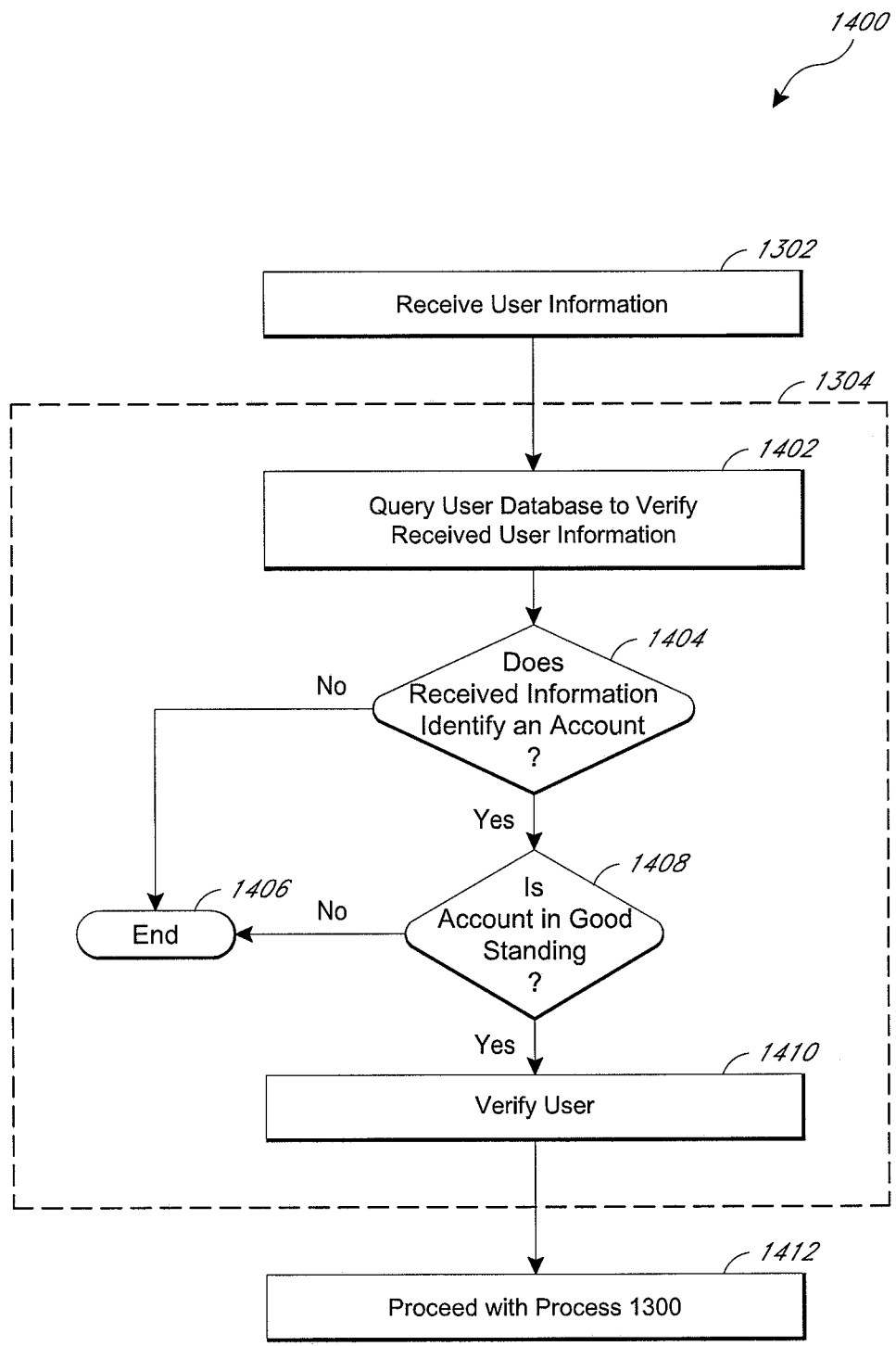
FIG. 14 is a flow chart illustrating one expanded embodiment of the process for authenticating user information performed in blocks 1302 and 1304 of FIG. 13.

FIG. 14 is a flow chart illustrating one embodiment of a process 1400 for authenticating user information defined by blocks 1302 and 1304 as depicted in FIG. 13. The process 1400 can authenticate the user and can verify the good standing of the user. In some embodiments, the process 1400 is performed by the central manifesting system 1004.

The process 1400 begins in block 1302 when the central manifesting system 1004 receives the user information from the user terminal 1002 as discussed above.

After the user information from the user terminal 1002 is received by the central manifesting system 1004, the process 1400 moves to block 1402 where the processor 1008 queries the user database 1014 for stored user information. In some embodiments, this information can include, a username, a password, an account number, an indicator of a responsible payer, and/or any other desired user information.

After the process 1400 receives the user information, the process 1400 proceeds to decision state 1404 and the processor 1008 determines if the received information identifies an account. In some embodiments, this determination is made by determining if the information received from the user terminal 1002 matches any of the information retrieved from the user database 1014. If the information received from the user terminal 1002 does not match information retrieved from the user database 1014, then the process 1400 can terminate at block 1406, or the process 1400 can direct the user to open a new user account. In some embodiments, this determination as to whether to terminate process 1400 or to request the opening of a new user account can be made based on predetermined criteria including procedures for opening a new user account.

If the information received from the user terminal 1002 matches information retrieved from the user database 1014, then the process moves to decision state and the processor 1008 determines if the account is in good standing. In some embodiments, this determination can include, for example, the processor 1008 querying the user database 1014 and/or querying the payment database 1016 for information relating to whether the user account is active, whether the user account is current on outstanding payments, whether the balance of payments due is above some threshold, whether the account use is outside of some predetermine range, or any other desired factor. If the user account is not in good standing, the process 1400 terminates at block 1406, or the central manifesting system 1004 can notify the user terminal 1002 that the user account has been suspended until the account is brought into good standing.

If the processor 1008 determines that the account is in good standing, then the process 1400 proceeds to block 1410 and the processor 1008 verifies the user. After the user has been verified, the process 1400 moves to block 1412 and passes to block 1306 of process 1300 as depicted in FIG. 13.

A person of skill in the art will recognize that the process 1400 for authenticating user information can include some or all of the above discussed steps, as well as steps additional to the above requested steps. A person of skill in the art will further recognize that the process 1400 for authenticating user information can include the above listed steps performed in any order, including in an order different than that shown above.

A person skilled in the art will recognize that each of these sub-systems can be inter-connected and controllably connected using a variety of techniques and hardware and that the present disclosure is not limited to any specific method of connection or connection hardware.

The technology is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for tracking label status, the system comprising:
   a first database comprising label information, wherein the label information comprises an identifier indicating the status of an electronic label; and
   a processor, implemented at least partially by hardware, operating in accordance with instructions stored in a memory, wherein the processor is configured to:
      cause generation of the electronic label, wherein the electronic label includes information of requested services;
      update the identifier in the first database to indicate existence of the electronic label;
      record a time indicative of the generation of the electronic label;
      cause generation of a physical label by a label user at a user terminal, the physical label configured to be affixed with an object that is to be processed according to the requested services, the physical label including the information of requested services;
      update the status of the electronic label in the first database to indicate the generation of the physical label;
      receive a signal from a scanning module indicating a physical label status change corresponding to the physical label being scanned by a physical scanning device after the object with the affixed physical label is delivered to a provider of the requested services;
      determine, in response to the received signal, whether the physical label has been scanned by the physical scanning device within a predetermined time period from the time indicative of the generation of the electronic label;
      if the physical label has been scanned by the physical scanning device within the predetermined time period, update the identifier in the first database to indicate that a service identified in the information of requested services has been provided;
      if the physical label has not been scanned by the physical scanning device within the predetermined time period, update the identifier in the first database to indicate that the status of the electronic label is not valid; and
      communicate the updated status of the electronic label to the label user via a communications device.

2. The system of claim 1, further comprising a second database, wherein the second database comprises payment information.

3. The system of claim 2, wherein the payment information is associated with the label user.

4. The system of claim 3, wherein the payment information comprises access information of an account of the label user.

5. The system of claim 4, wherein the processor is further configured to request payment information from the second database after receiving a signal indicating that the status has changed.

6. The system of claim 5, wherein the processor is further configured to access the account and debit the account.

7. A method of tracking label status, the method comprising:
   maintaining an identifier in a first database comprising an identifier indicating a status of an electronic label;
   generating the electronic label, wherein the electronic label includes information of requested services;
   updating the identifier in the first database to indicate existence of the electronic label;
   recording a time indicative of generation, of the electronic label;
   causing generation of a physical label by a label user at a user terminal, the physical label configured to be affixed with an object that is to be processed according to the requested object services, the physical label including the information of requested services;
   updating the status of the electronic label in the first database to indicate the generation of the physical label;
   receiving a signal from a scanning module indicating a status change of the physical label corresponding to the physical label being scanned by a physical scanning device and after the object with the affixed physical label is delivered to a provider of the requested services;
   determining, in response to the received signal, whether the physical label has been scanned by the physical scanning device within a predetermined time period from the time indicative of the generation of the electronic label;
   if the physical label has been scanned by the physical scanning device within the predetermined time period, updating the status in the first database to indicate that a service identified in the information of requested services has been provided;

if the physical label has not been scanned by the physical scanning device within the predetermined time period, updating the status in the first database to indicate that the status of the electronic label is not valid; and communicating the updated status of the electronic label to the label user via a communications device.

8. The method of claim 7, wherein a second database comprises payment information associated with the label user.

9. The method of claim 8, wherein the payment information comprises access information of an account of the label user.

10. The method of claim 9, further comprising requesting payment information from the second database after receiving a signal indicating that the status has changed.

11. The method of claim 10, further comprising accessing the account and debiting the account.

12. A system configured to track label status, the system comprising:

means for maintaining an identifier in a first database comprising an identifier indicating a status of an electronic label;

means for generating the electronic label, wherein the electronic label includes information of requested services;

means for updating the identifier in the first database to indicate existence of the electronic label;

means for recording a time indicative of generation of the electronic label;

means for causing generation of a physical label by a label user at a user terminal, the physical label configured to be affixed with an object that is to be processed according to the requested object services, the physical label including the information of requested services;

means for updating the status of the electronic label in the first database to indicate the generation of the physical label;

means for receiving a signal from a scanning module indicating a status change of the physical label corresponding to the physical label being scanned by a physical scanning device and after the object with the affixed physical label is delivered to a provider of the requested services;

means for determining, in response to receiving the signal, that the physical label has been scanned by the physical scanning device within a predetermined time from the time indicative of generation of the electronic label;

means for updating the status, in the first database, if the physical label has been scanned by the physical scanning device within the predetermined time period, to indicate that a service identified in the information of requested services has been provided, and if the physical label has not been scanned by the physical scanning device within the predetermined time period, to indicate that the status of the electronic label is not valid; and means for communicating the updated status of the electronic label to the label user via a communications device.

* * * * *